United States Patent
Pan

(10) Patent No.: US 7,554,411 B2
(45) Date of Patent: *Jun. 30, 2009

(54) WIRELESS TRANSMITTER HAVING MULTIPLE PROGRAMMABLE GAIN AMPLIFIERS (PGAS) WITH TUNED IMPEDANCE TO PROVIDE SUBSTANTIALLY LINEAR RESPONSE

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 11/656,490

(22) Filed: Jan. 23, 2007

(65) Prior Publication Data

US 2007/0229171 A1      Oct. 4, 2007

Related U.S. Application Data

(63) Continuation of application No. 11/094,272, filed on Mar. 31, 2005, now Pat. No. 7,183,858.

(51) Int. Cl.
*H03F 3/191* (2006.01)

(52) U.S. Cl. ........................ 330/305; 330/126

(58) Field of Classification Search ................. 330/126, 330/305; 455/120, 75, 118
See application file for complete search history.

(56) References Cited

U.S. PATENT DOCUMENTS

| 3,739,292 | A | 6/1973 | Furuhashi |
|---|---|---|---|
| 5,565,813 | A | 10/1996 | Connell et al. |
| 6,774,717 | B2 | 8/2004 | Hellberg |
| 6,831,511 | B2 | 12/2004 | Hollingsworth et al. |
| 7,031,668 | B2 | 4/2006 | Darabi et al. |
| 7,120,411 | B2 | 10/2006 | Darabi |
| 7,184,735 | B2 | 2/2007 | Bhatti et al. |
| 2002/0175763 | A1 | 11/2002 | Dasgupta et al. |
| 2002/0186079 | A1 | 12/2002 | Kobayashi |
| 2003/0011434 | A1 | 1/2003 | Luo et al. |
| 2005/0012547 | A1 | 1/2005 | Kwon et al. |
| 2005/0287964 | A1 | 12/2005 | Tanaka et al. |
| 2006/0052071 | A1 | 3/2006 | Pan |
| 2006/0178165 | A1 | 8/2006 | Vassiliou et al. |
| 2006/0229038 | A1 | 10/2006 | Pan |
| 2006/0255857 | A1 | 11/2006 | Parker et al. |

*Primary Examiner*—Robert Pascal
*Assistant Examiner*—Hieu P Nguyen
(74) *Attorney, Agent, or Firm*—Sterne, Kessler, Goldstein & Fox P.L.L.C.

(57) ABSTRACT

A method and apparatus are provided for enabling a transmitter to have a substantially linear magnitude response and a substantially linear phase response. The transmitter includes first and second programmable gain amplifiers (PGAs). The first PGA is tuned to have a resonant frequency that is less than an operating frequency of the first PGA. The second PGA is tuned to have a resonant frequency that is greater than an operating frequency of the second PGA. A magnitude response at an output of the first PGA and a magnitude response at an output of the second PGA combine to provide a substantially linear magnitude response across a frequency range that includes the operating frequency of the first or second PGA. According to an embodiment, the first and second PGAs have the same operating frequency.

44 Claims, 33 Drawing Sheets

| Constellation Point | Bit Combination |
|---|---|
| 210a | 0000 |
| 210b | 0001 |
| 210c | 0010 |
| 210d | 0011 |
| 210e | 0100 |
| 210f | 0101 |
| 210g | 0110 |
| 210h | 0111 |
| 210i | 1000 |
| 210j | 1001 |
| 210k | 1010 |
| 210l | 1011 |
| 210m | 1100 |
| 210n | 1101 |
| 210o | 1110 |
| 210p | 1111 |

FIG. 2A

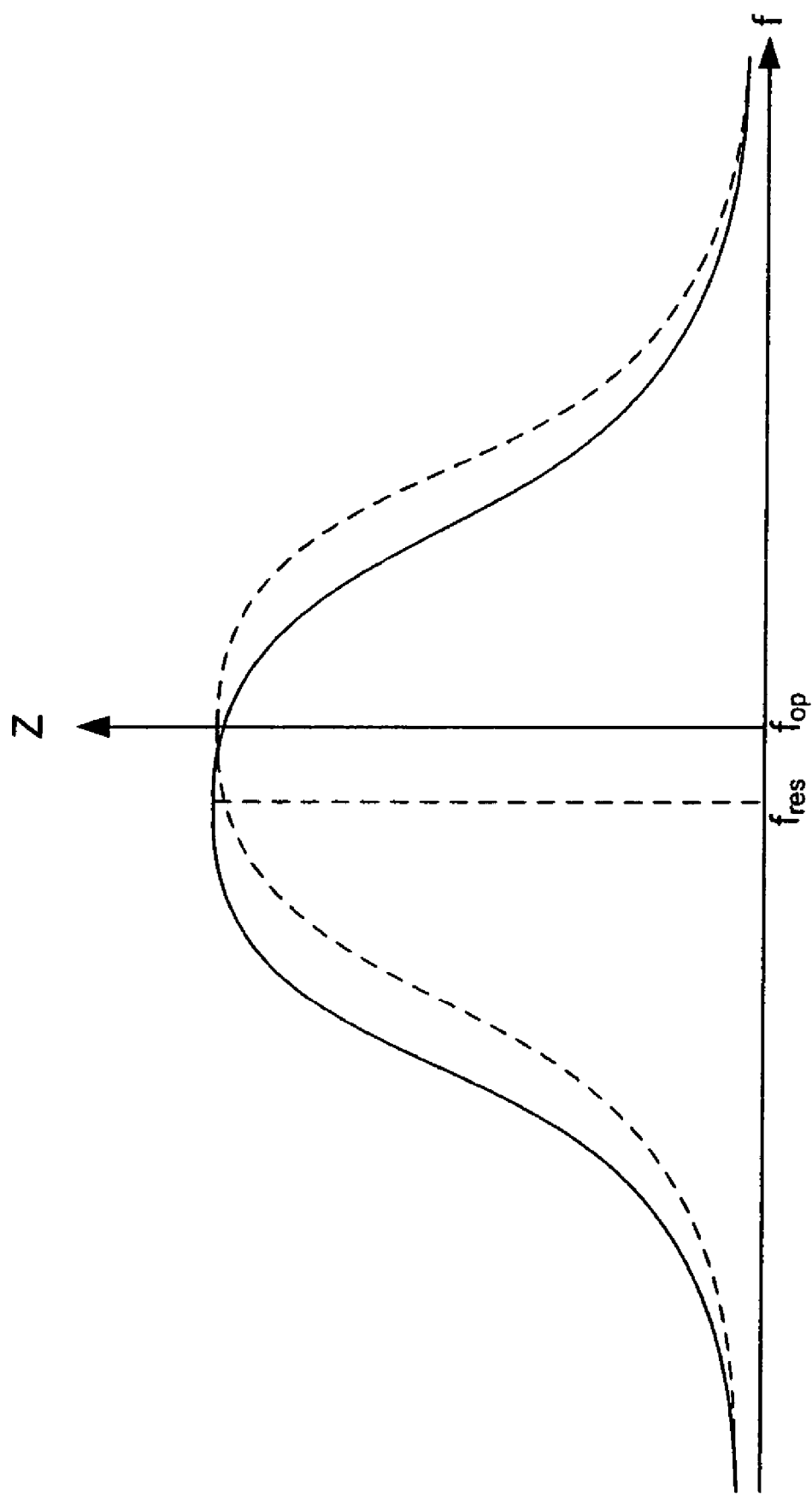

WIRELESS TRANSMITTER HAVING MULTIPLE PROGRAMMABLE GAIN AMPLIFIERS (PGAS) WITH TUNED IMPEDANCE TO PROVIDE SUBSTANTIALLY LINEAR RESPONSE

CROSS-REFERENCE TO RELATED APPLICATION

This application is a continuation of U.S. patent application Ser. No. 11/094,272 filed Mar. 31, 2005, now issued as U.S. Pat. No. 7,183,858, which is incorporated herein by reference in its entirety.

BACKGROUND OF THE INVENTION

1. Field of the Invention

The present invention generally relates to transmitters, and more specifically to wireless transmitters.

2. Background

Conventional wireless transmitters are designed with an emphasis on gain linearity (also referred to as magnitude linearity), which is only one factor in the performance of a transmitter. An often overlooked factor is phase linearity. Even if a conventional wireless transmitter is capable of achieving a linear magnitude response, the phase response of the transmitter typically is not linear. Phase response generally is not considered in the design of a wireless transmitter because sources of phase non-linearity are difficult to determine.

What is needed, then, is a wireless transmitter that is capable of providing a substantially linear magnitude response and a substantially linear phase response.

BRIEF SUMMARY OF THE INVENTION

The present invention provides a method and apparatus for enabling a transmitter to provide a substantially linear magnitude response and a substantially linear phase response. In particular, an embodiment of the present invention provides a method and apparatus for providing a linear magnitude response using programmable gain amplifiers (PGAs) that have different resonant frequencies.

According to an embodiment, the transmitter includes a first PGA and a second PGA. The first PGA has a first resonant frequency that is less than an operating frequency of the first PGA. The second PGA has a second resonant frequency that is greater than an operating frequency of the second PGA. The first PGA and the second PGA are coupled in parallel to provide a substantially linear magnitude response across a range of frequencies that includes the first and/or second operating frequencies. The first resonant frequency and the second resonant frequency may be the same.

A first non-linear magnitude response at an output of the first PGA and a second non-linear magnitude response at an output of the second PGA may be combined to provide the substantially linear magnitude response. In an embodiment, a magnitude distortion at an output of the first PGA is non-zero at the first operating frequency, and a magnitude distortion at an output of the second PGA is non-zero at the second operating frequency. Combining the first and second PGAs in parallel may provide a magnitude distortion of approximately zero at the first and/or second operating frequencies.

In an embodiment, an output inductance of the first PGA is selected to provide the first resonant frequency, and an output inductance of the second PGA is selected to provide the second resonant frequency. The first and/or second operating frequency may be approximately 2.4 GHz. The first resonant frequency may be approximately 2 GHz, and the second resonant frequency may be approximately 3 GHz.

According to an embodiment, the first PGA is coupled in series with a first power amplifier driver (PAD) in a first amplifier block, and the second PGA is coupled in series with a second PAD in a second amplifier block. The first amplifier block and the second amplifier block are coupled in parallel with each other. A phase response of the transmitter may be substantially insensitive to a change of an input capacitance of the first PAD or the second PAD. In an embodiment, an input capacitance of the first PAD and an input capacitance of the second PAD are substantially the same. In another embodiment, a first bias of the first PAD and a second bias of the second PAD are the same. For example, the first bias may be a gate-to-source voltage of the first PAD, and the second bias may be a gate-to-source voltage of the second PAD.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

Figure 2:
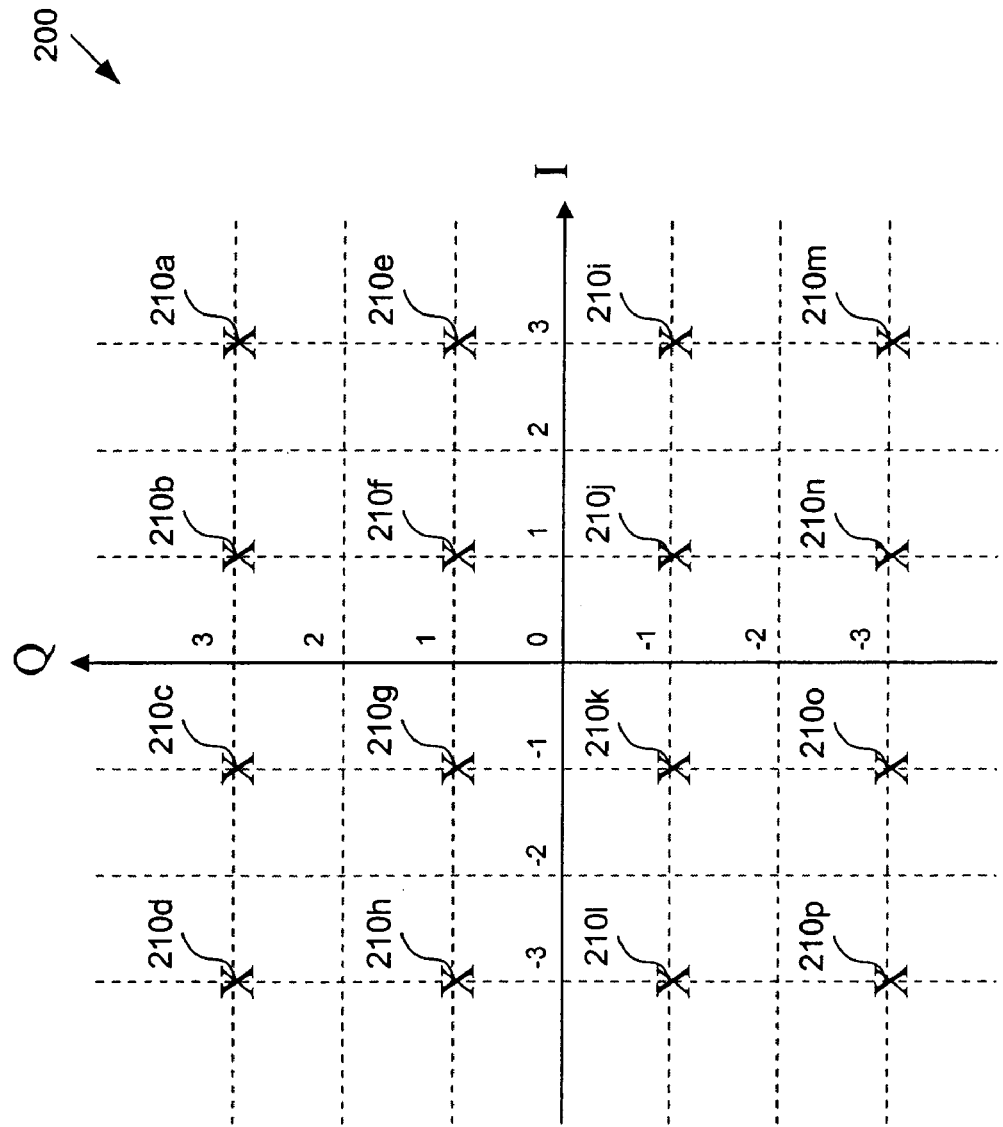
FIG. 2 illustrates a constellation showing a relationship between in-phase and quadrature components from a baseband processor that have been modulated in accordance with a sixteen quadrature amplitude modulation (16 QAM) technique according to an embodiment of the present invention.

FIG. 2A provides an example table showing the relationship between bit combinations and points in the constellation shown in FIG. 2 according to an embodiment of the present invention.

Figure 3:
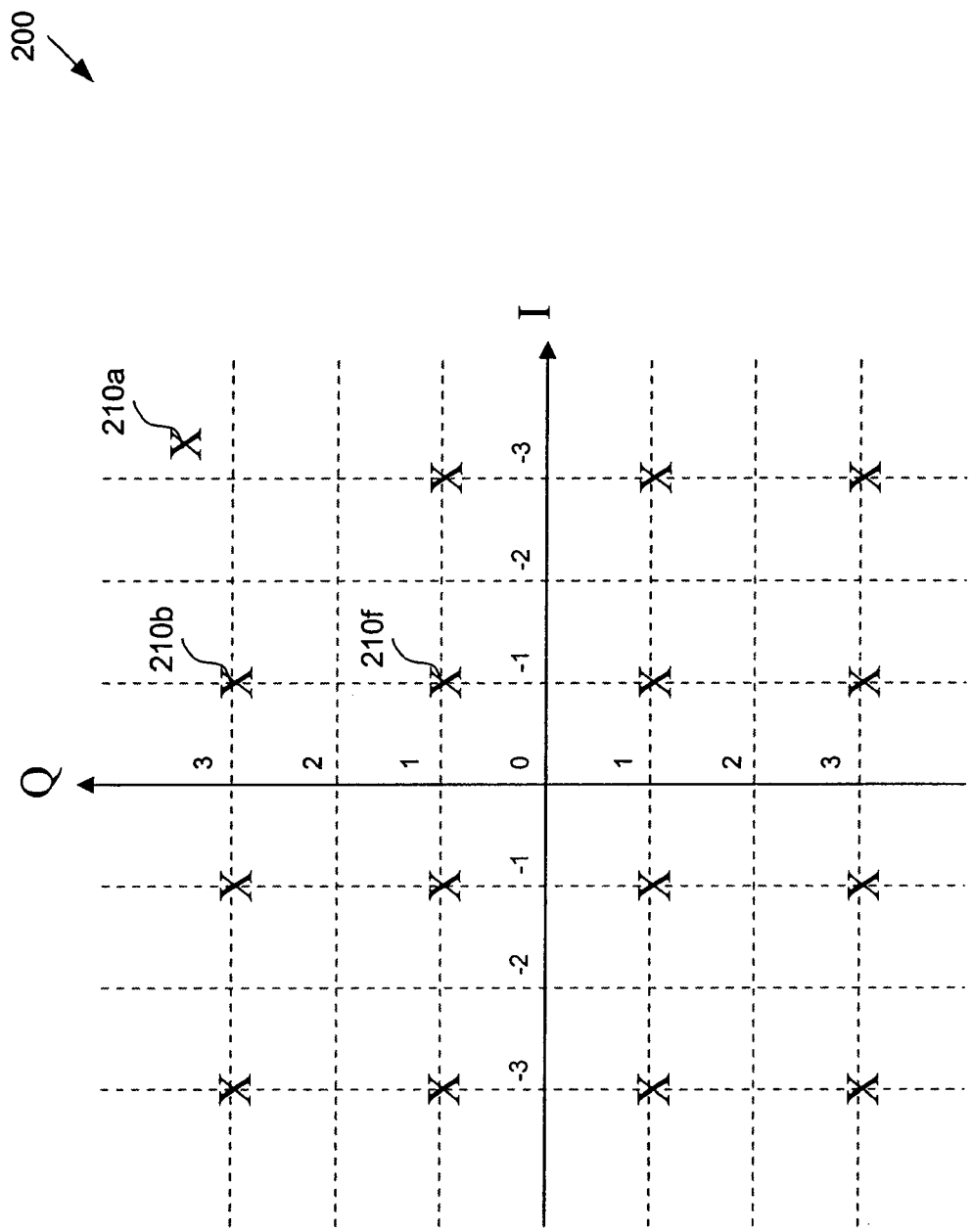

FIG. 3 illustrates the constellation of FIG. 2 showing magnitude distortion according to an embodiment of the present invention.

Figure 4:
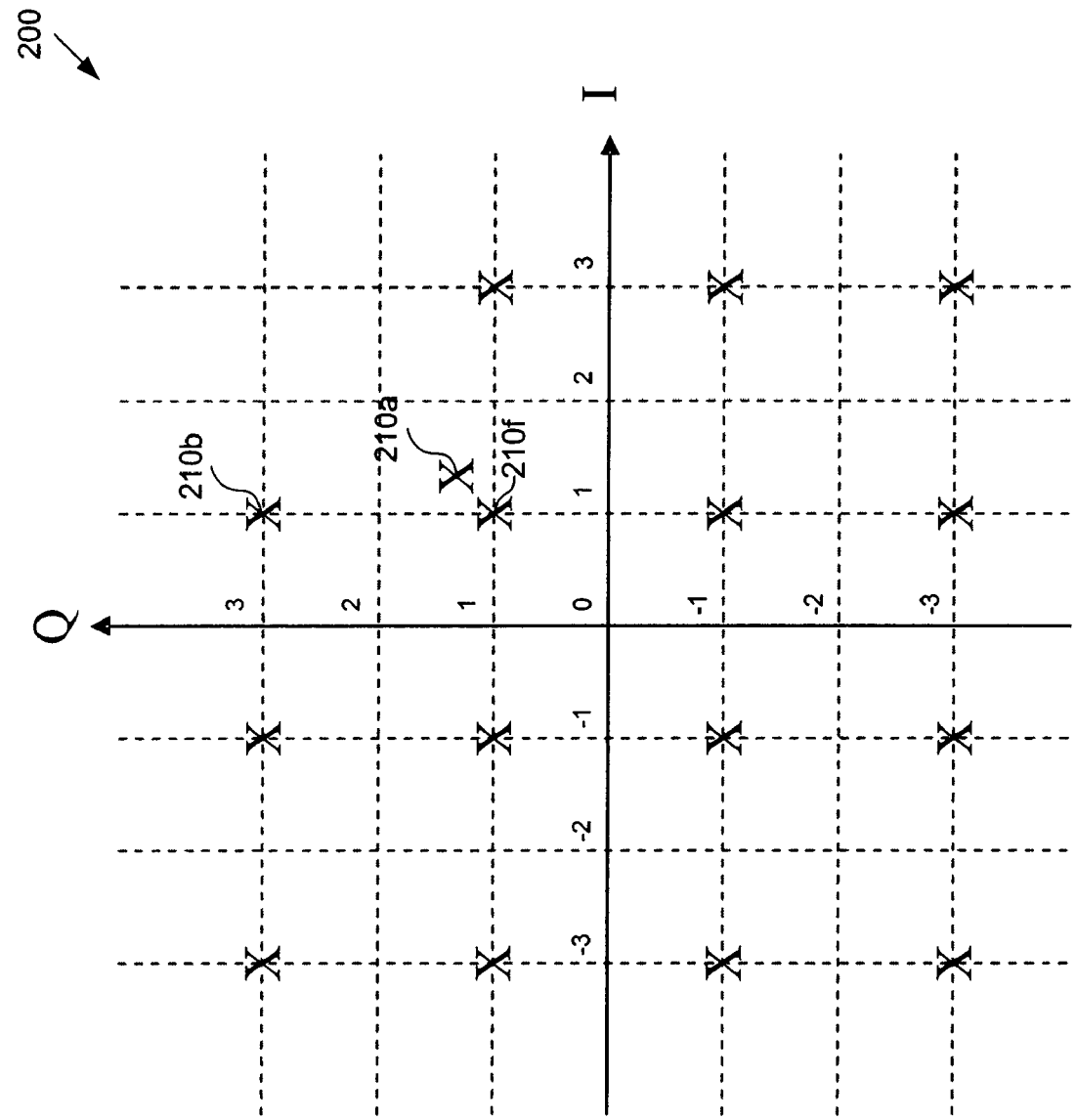

FIG. 4 illustrates the constellation of FIG. 2 showing magnitude distortion according to another embodiment of the present invention.

Figure 5:
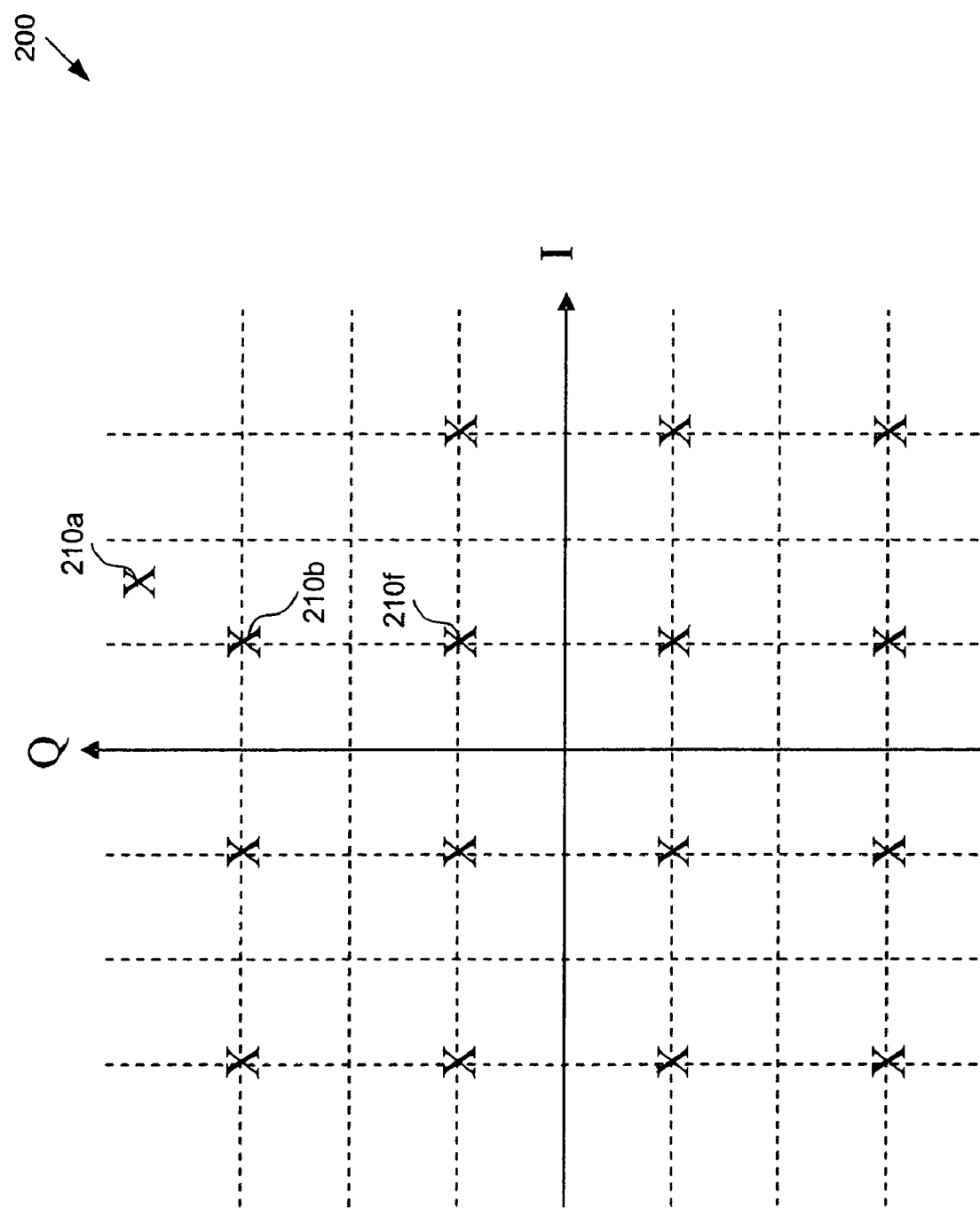

FIG. 5 illustrates the constellation of FIG. 2 showing phase distortion according to an embodiment of the present invention.

Figure 1:
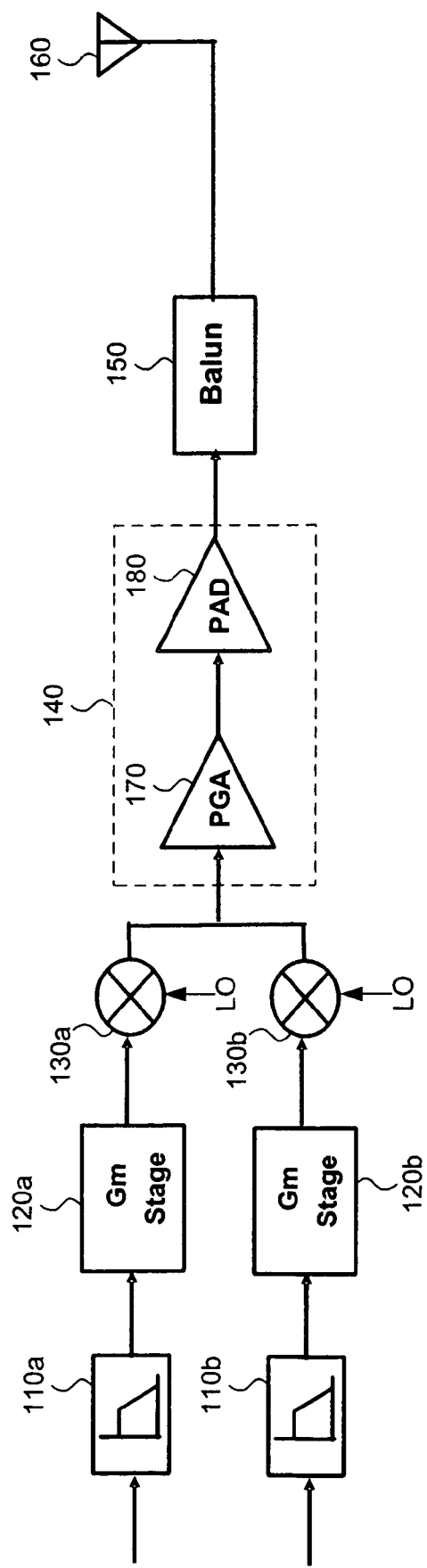
FIG. 1 is a block diagram of an example transmitter according to an embodiment of the present invention.
Figure 6:
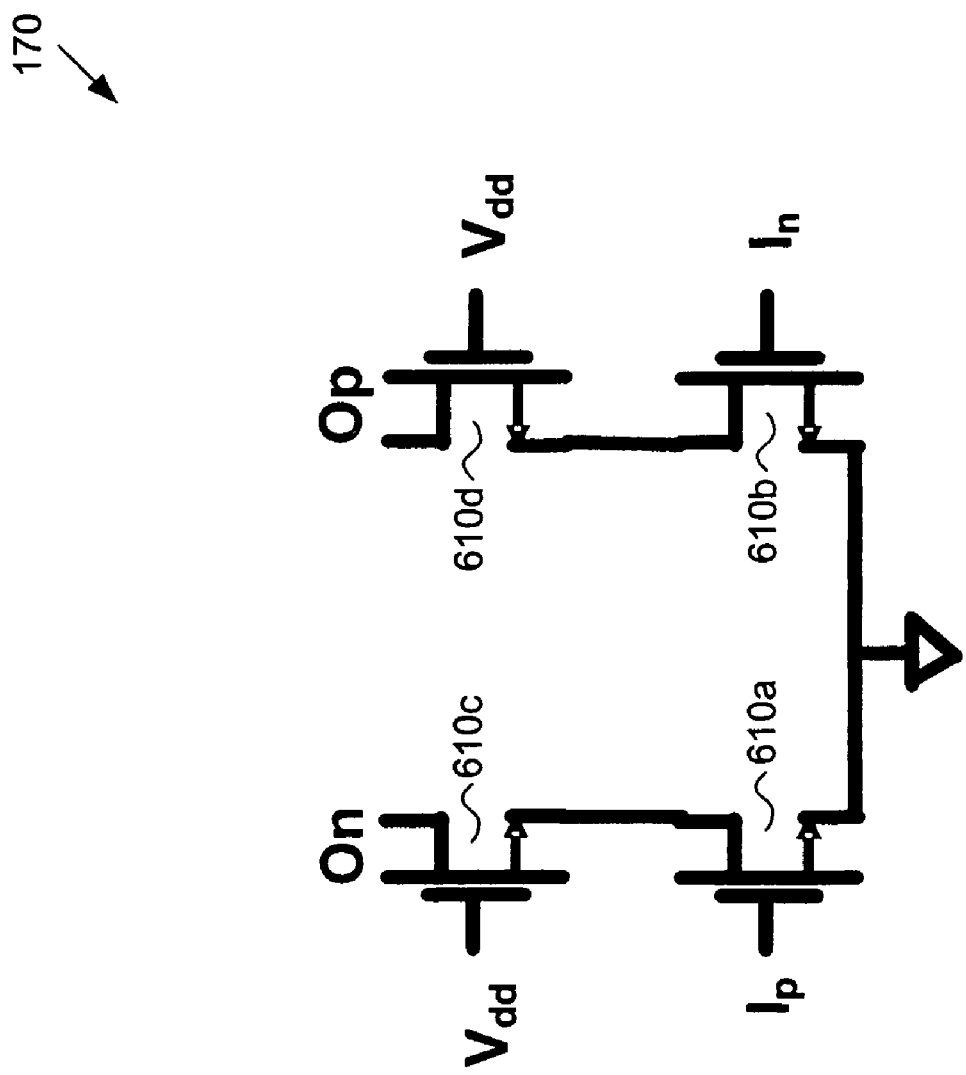

FIG. 6 is an example schematic of the PGA shown in FIG. 1 according to an embodiment of the present invention.

Figure 7:
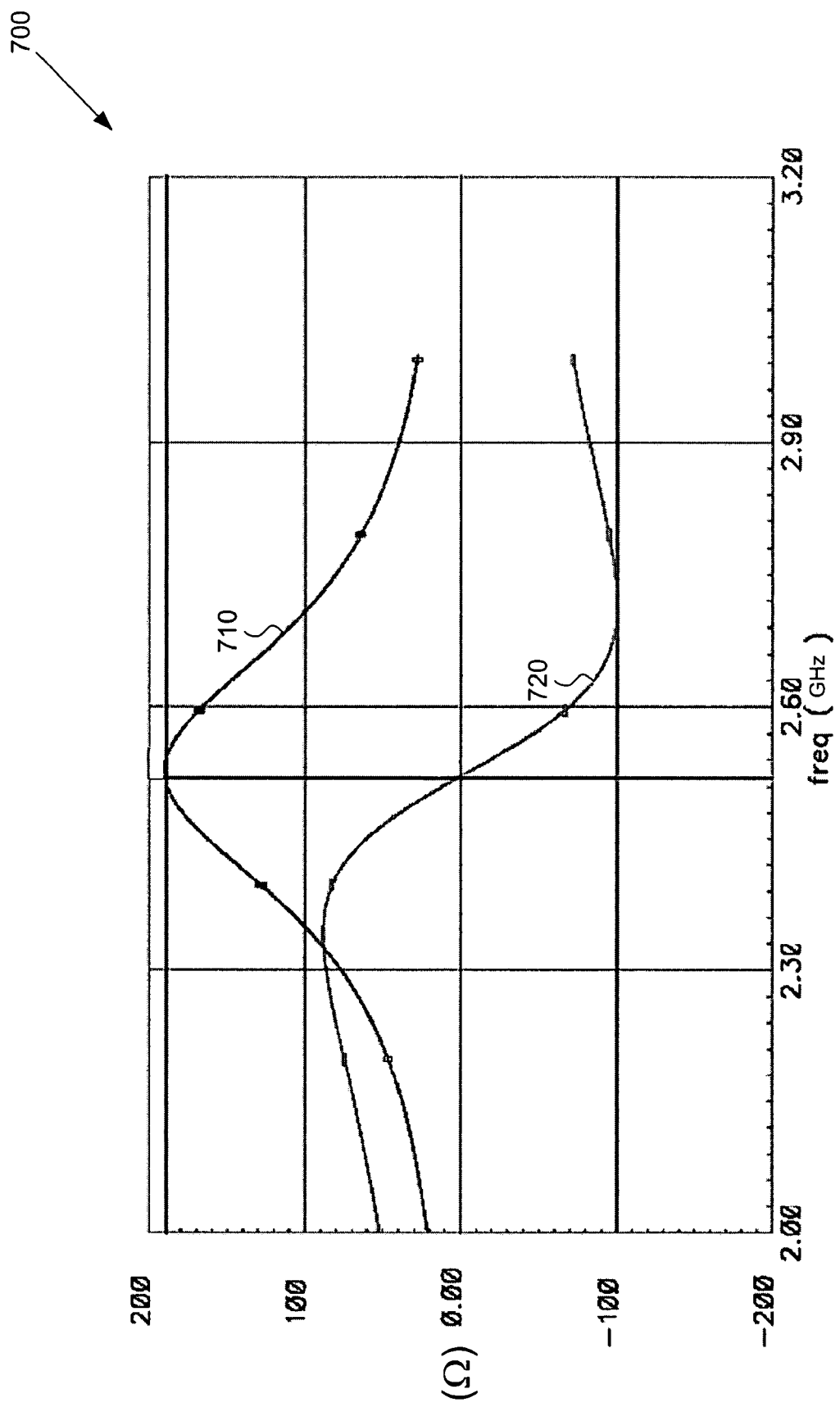

FIG. 7 shows an example plot of the load resistance and the load reactance of the PGA shown in FIG. 6 according to an embodiment of the present invention.

Figure 8:
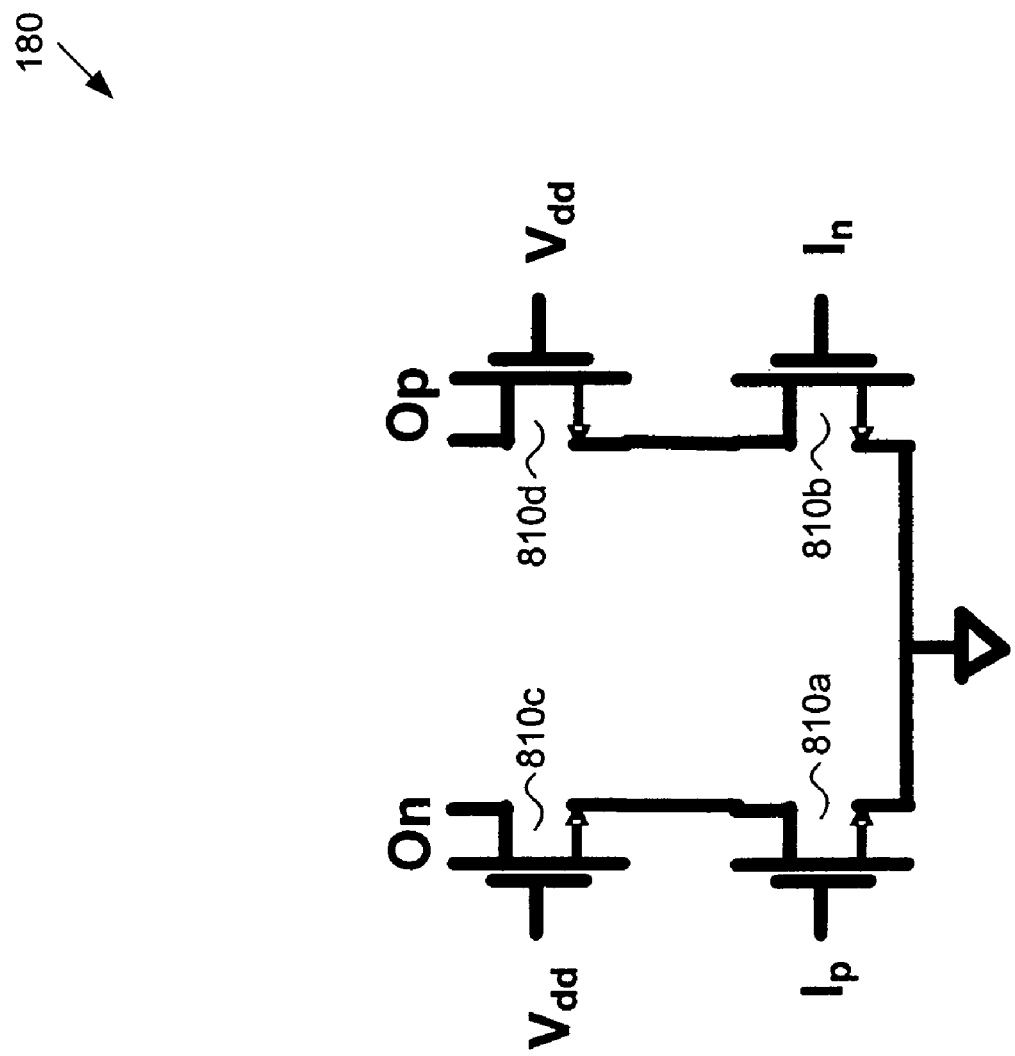

FIG. 8 is an example schematic of the PAD shown in FIG. 1 according to an embodiment of the present invention.

Figure 9:
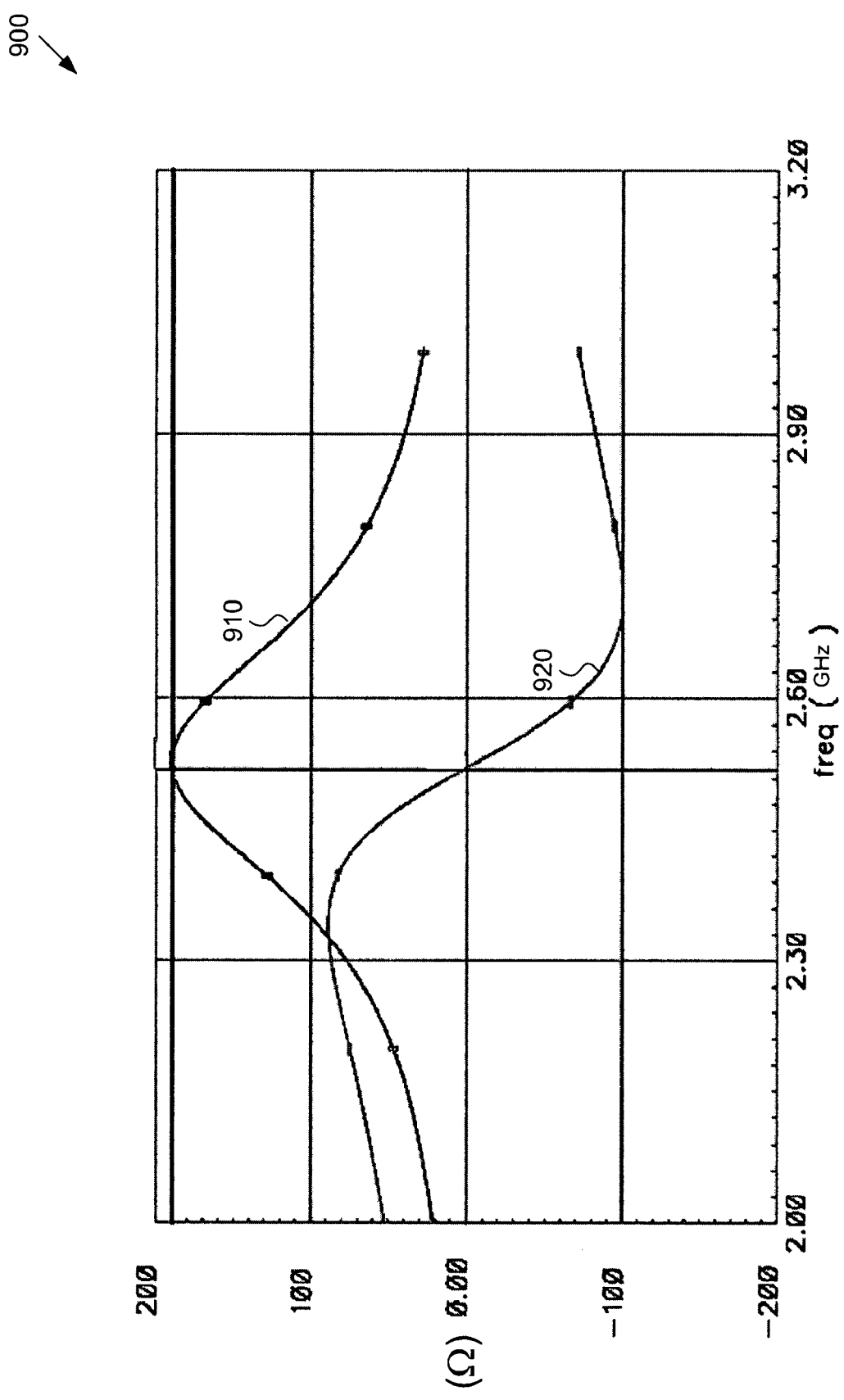

FIG. 9 shows an example plot of the load resistance and the load reactance of the PAD shown in FIG. 8 according to an embodiment of the present invention.

Figure 10:
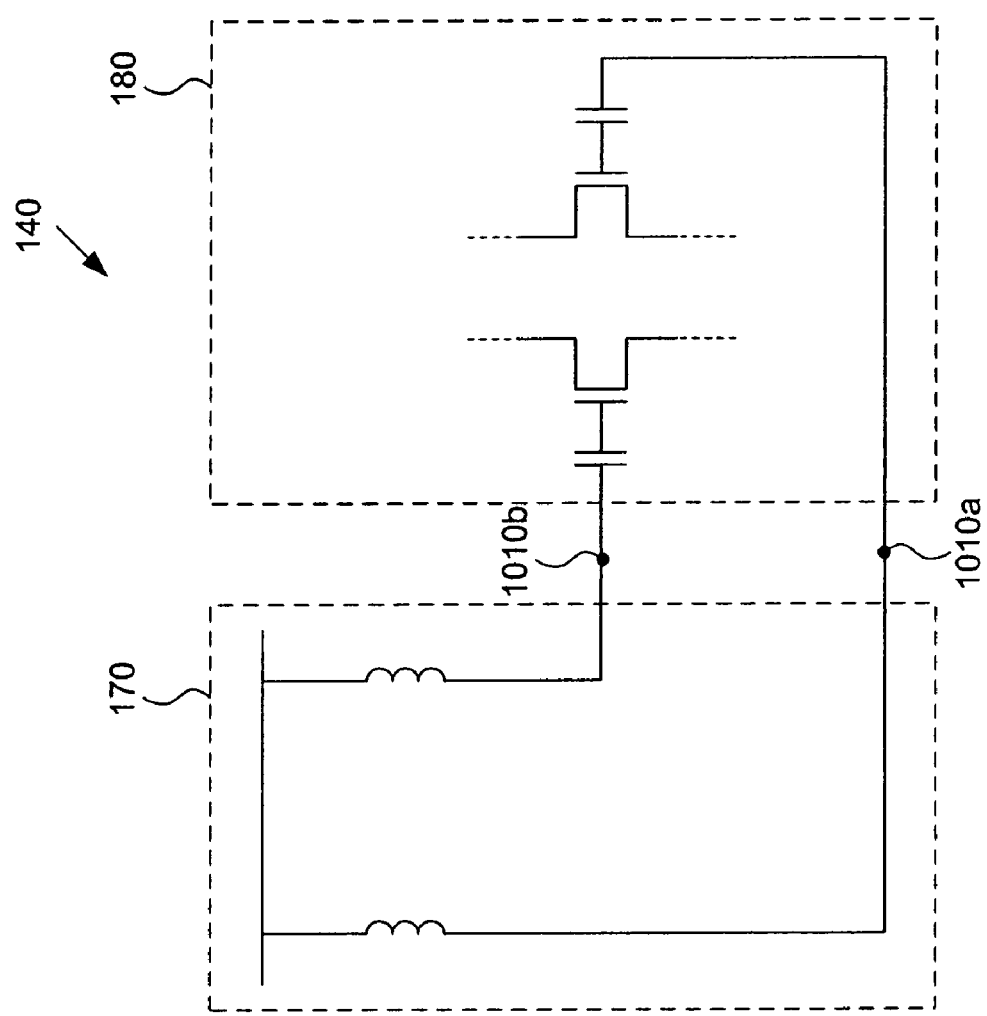

FIG. 10 is a simplified schematic of the amplifier block shown in FIG. 1 including the PGA and the PAD according to an embodiment of the present invention.

Figure 10A:
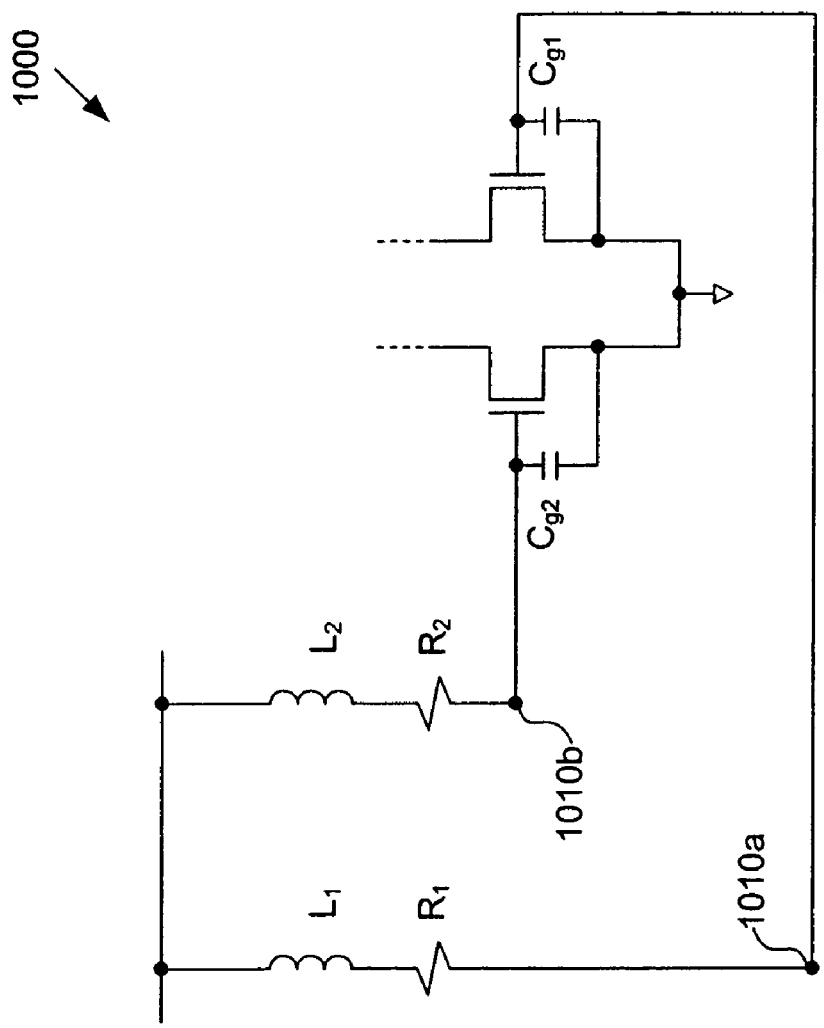

FIG. 10A is an equivalent circuit of the simplified schematic shown in FIG. 10 according to an embodiment of the present invention.

Figure 11:
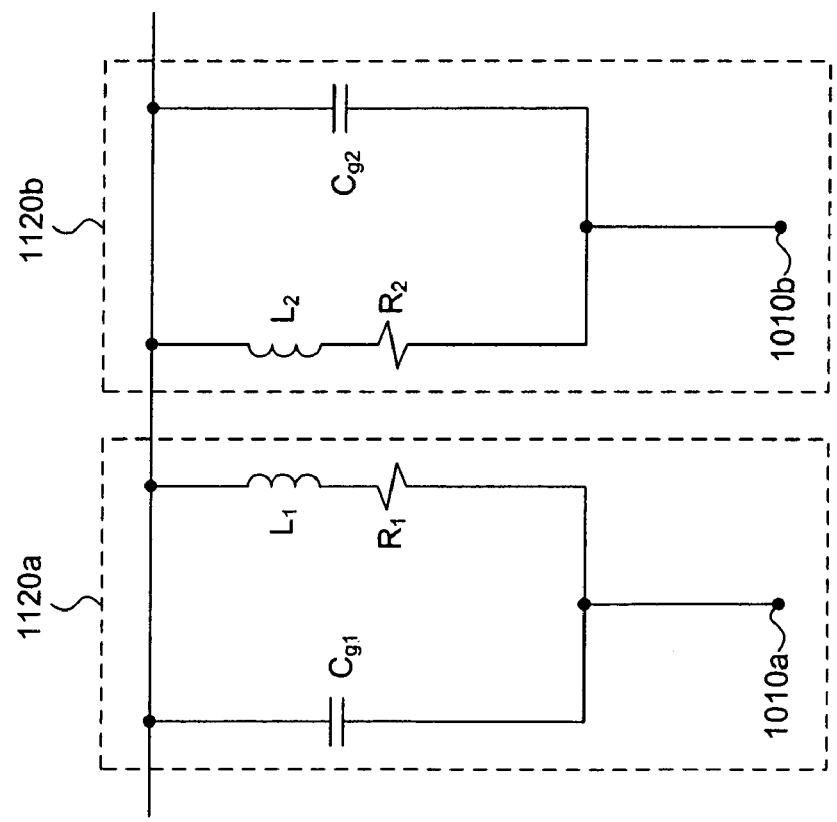

FIG. 11 is a simplified version of the equivalent circuit shown in FIG. 10 according to an embodiment of the present invention.

Figure 12:
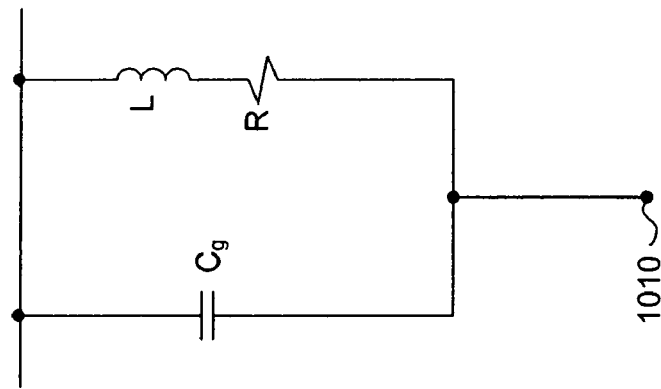

FIG. 12 is an equivalent circuit that combines differential portions of the equivalent circuit shown in FIG. 11 according to an embodiment of the present invention.

Figure 13:
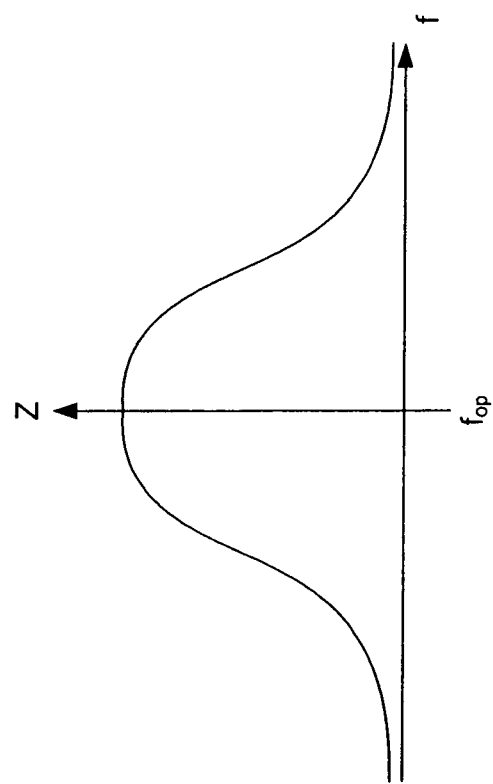

FIG. 13 is a graphical representation of the magnitude of the impedance at the output of PGA shown in FIG. 6 with respect to frequency according to an embodiment of the present invention.

Figure 14:
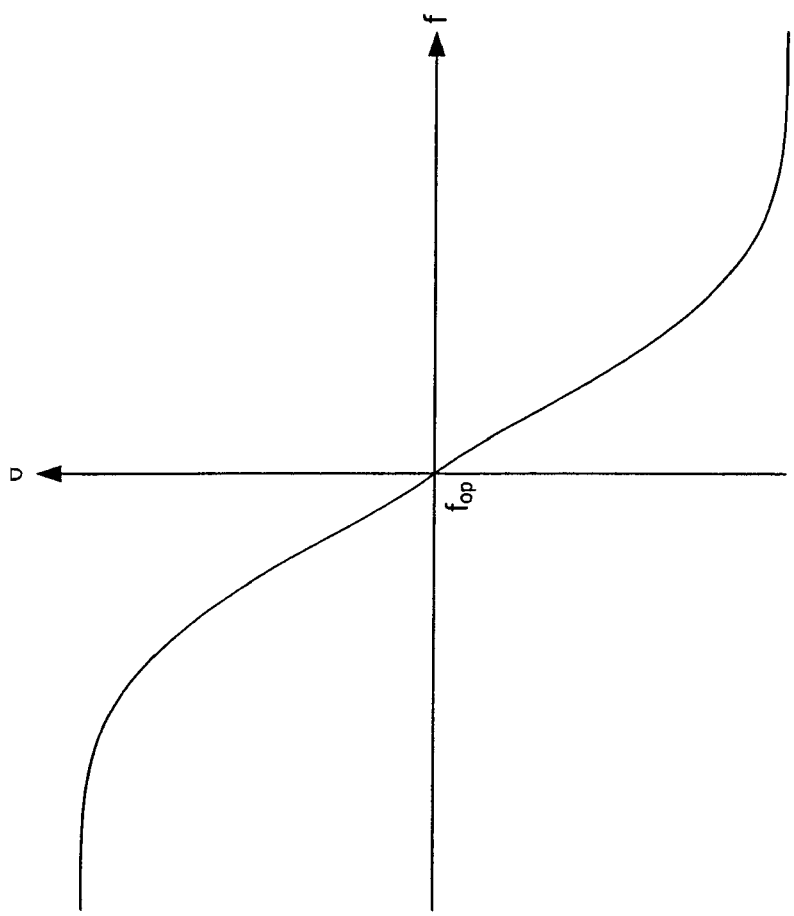

FIG. 14 is a graphical representation of the phase of the impedance at the output of the PGA shown in FIG. 6 with respect to frequency according to an embodiment of the present invention.

FIG. 15 is a graphical representation of the magnitude response at the output of the PGA shown in FIG. 6, where the resonant frequency $f_{res}$ of the equivalent circuit shown in FIG. 12 is less than the operating frequency $f_{op}$ of the PGA according to an embodiment of the present invention.

Figure 16:
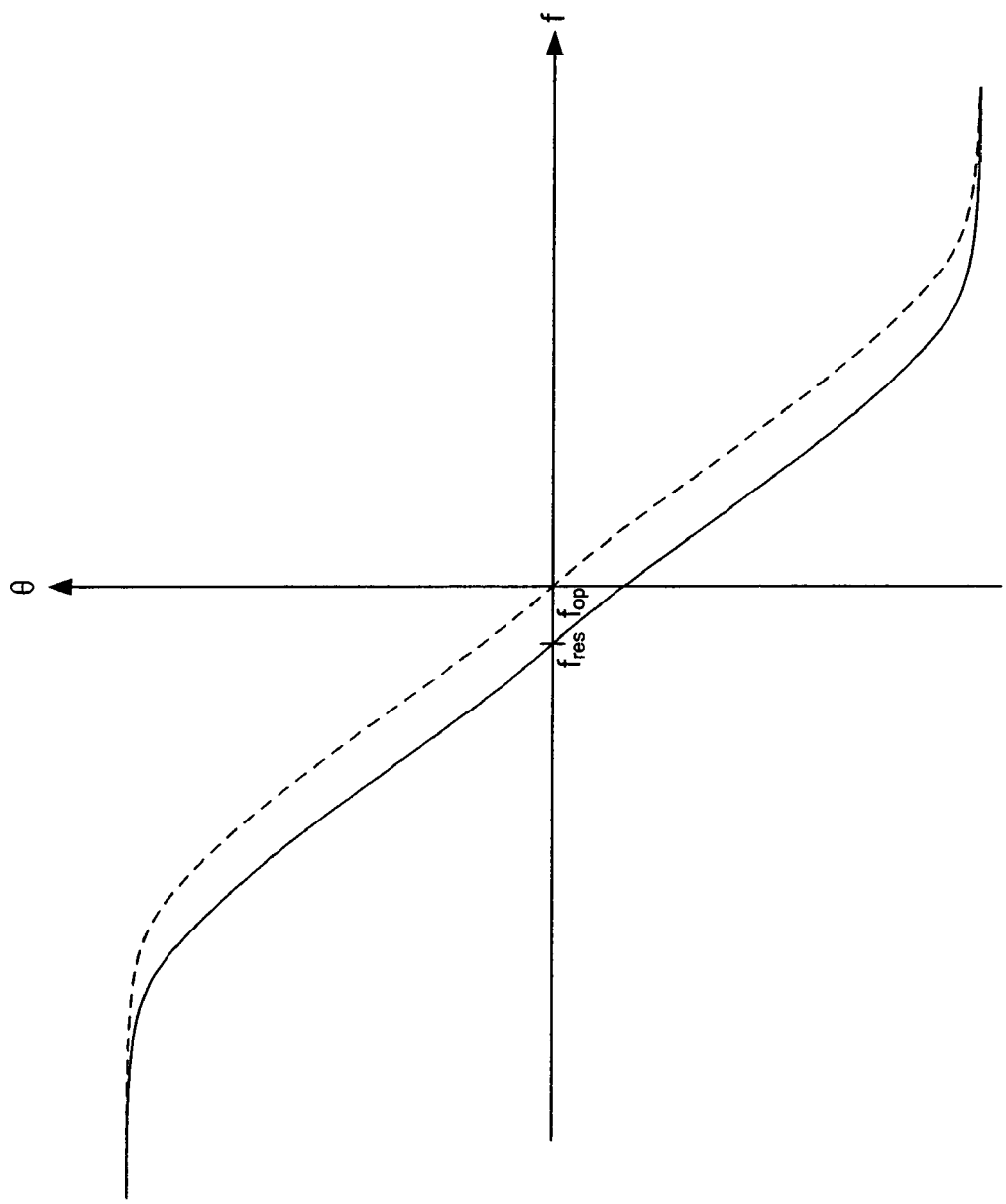

FIG. 16 is a graphical representation of the phase response at the output of the PGA shown in FIG. 6, where the resonant frequency $f_{res}$ of the equivalent circuit shown in FIG. 12 is less than the operating frequency $f_{op}$ of the PGA according to an embodiment of the present invention.

Figure 17:
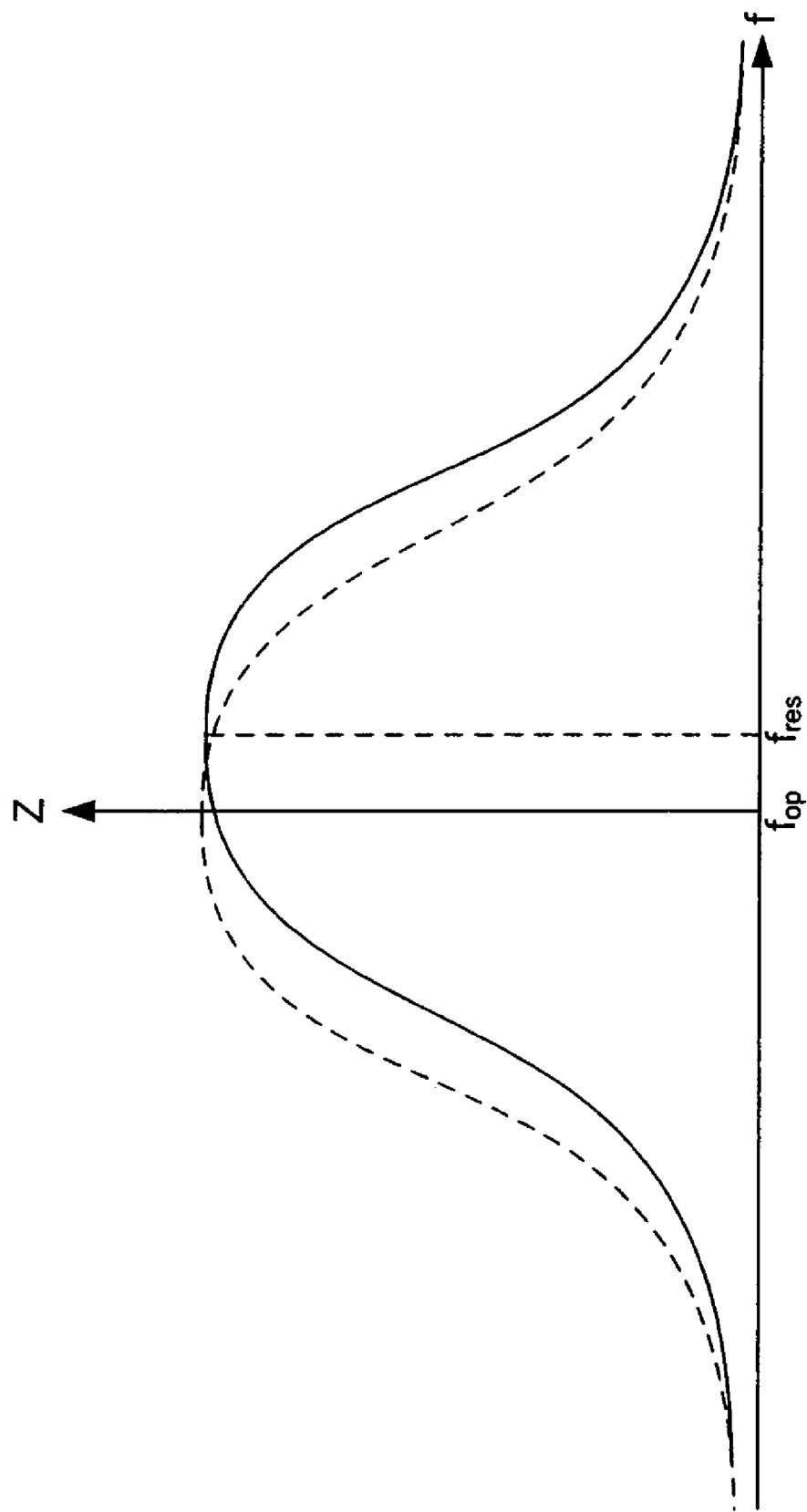

FIG. 17 is a graphical representation of the magnitude response at the output of the PGA shown in FIG. 6, where the resonant frequency $f_{res}$ of the equivalent circuit shown in FIG. 12 is greater than the operating frequency $f_{op}$ of the PGA according to an embodiment of the present invention.

Figure 18:
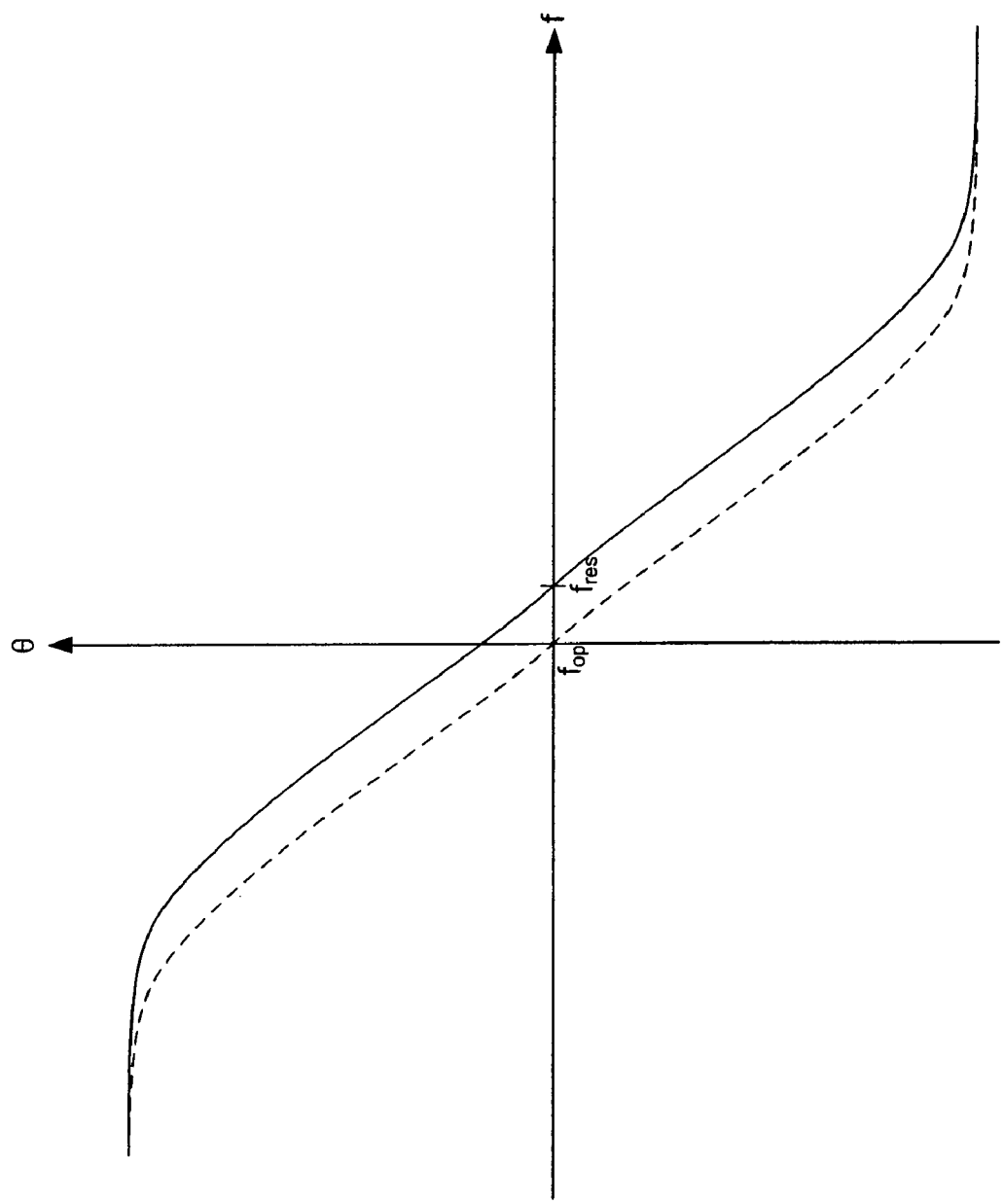

FIG. 18 is a graphical representation of the phase response at the output of the PGA shown in FIG. 6, where the resonant frequency $f_{res}$ of the equivalent circuit shown in FIG. 12 is greater than the operating frequency $f_{op}$ of the PGA according to an embodiment of the present invention.

Figure 19A:
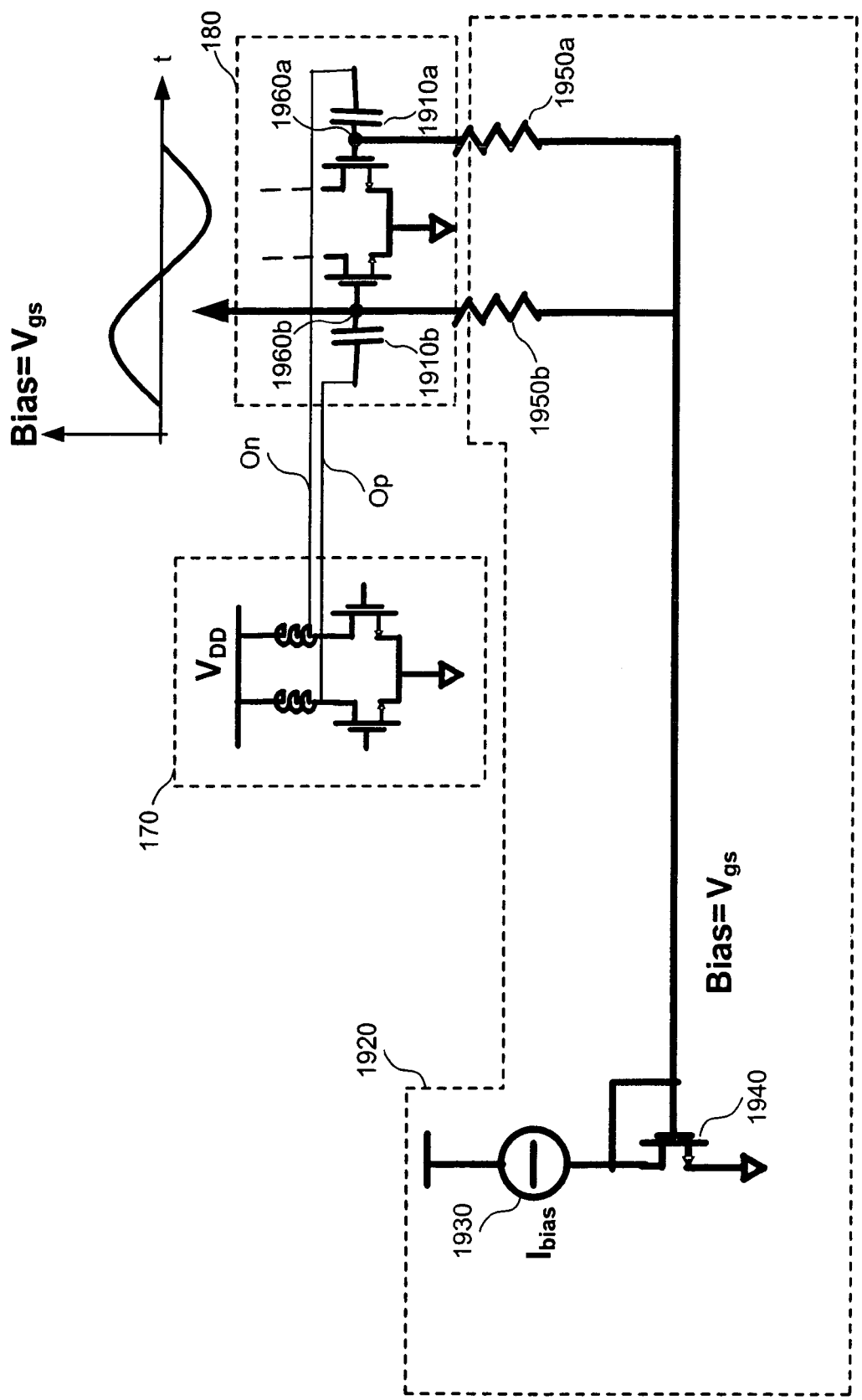

FIG. 19A shows an example biasing configuration of the PAD shown in FIG. 8 according to an embodiment of the present invention.

Figure 19B:
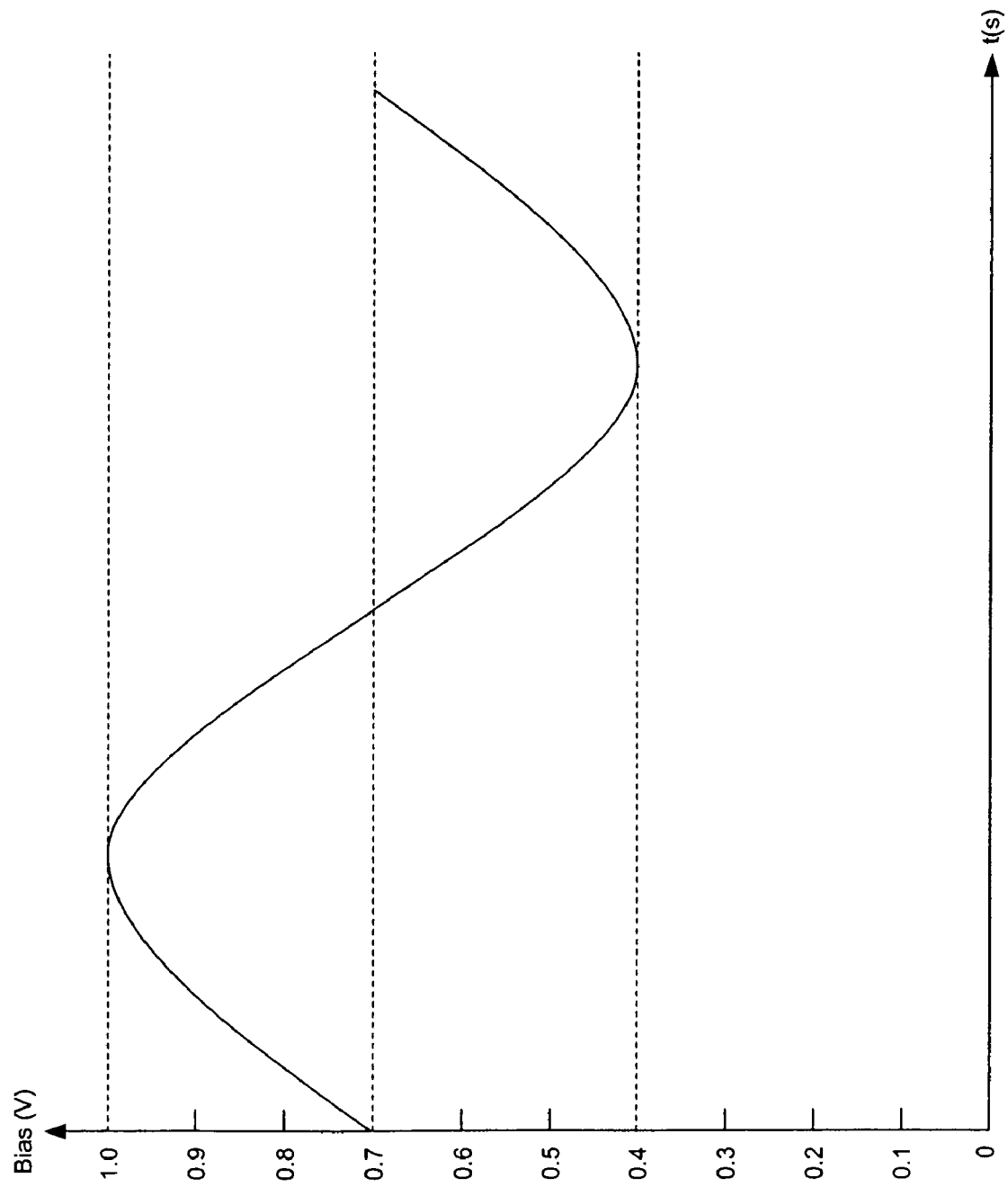

FIG. 19B is a graphical representation of a bias applied to input terminals of the PAD with respect to time according to an embodiment of the present invention.

Figure 19C:
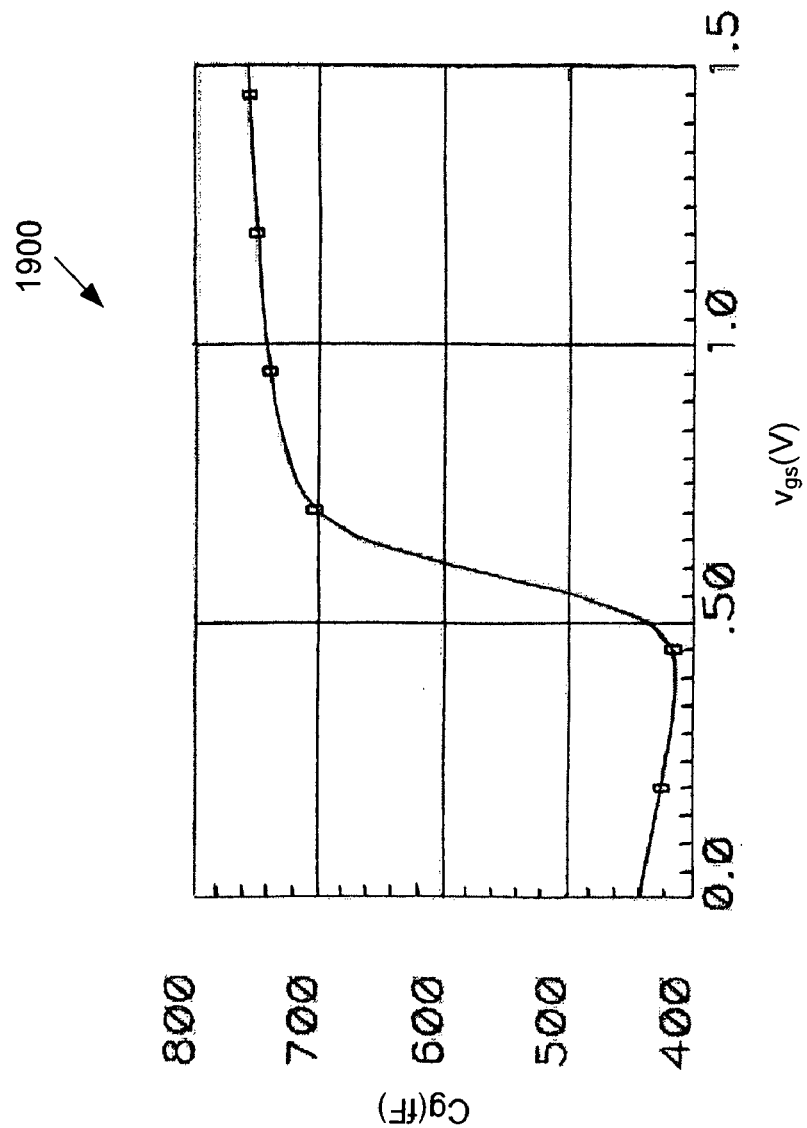

FIG. 19C shows an example plot of a relationship between the input capacitance $C_g$ of the PAD shown in FIG. 8 and the gate-to-source voltage ($v_{gs}$) of the PAD according to an embodiment of the present invention.

Figure 20:
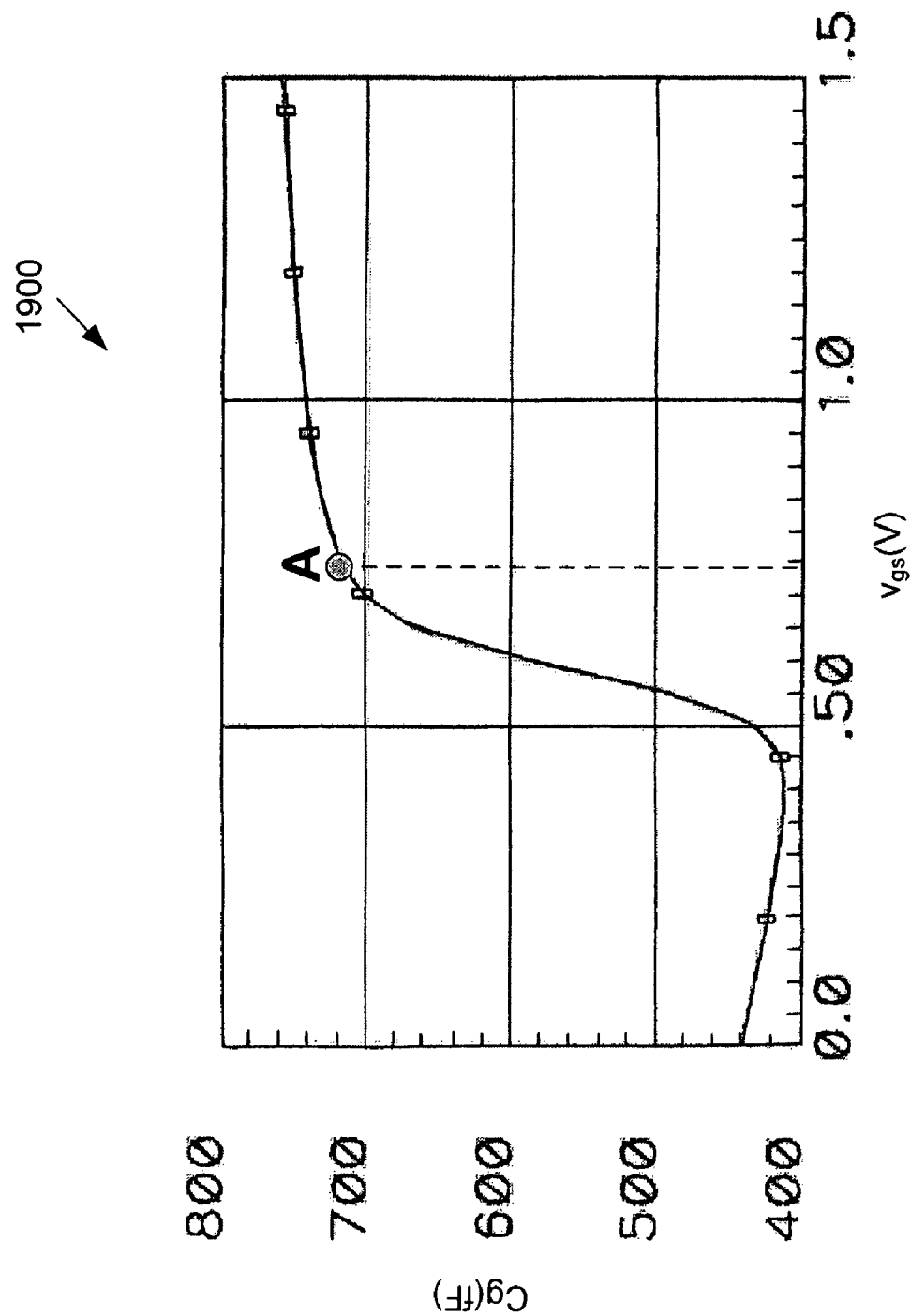

FIG. 20 illustrates an example biasing point A of the PAD shown in FIG. 8 according to an embodiment of the present invention.

Figure 21:
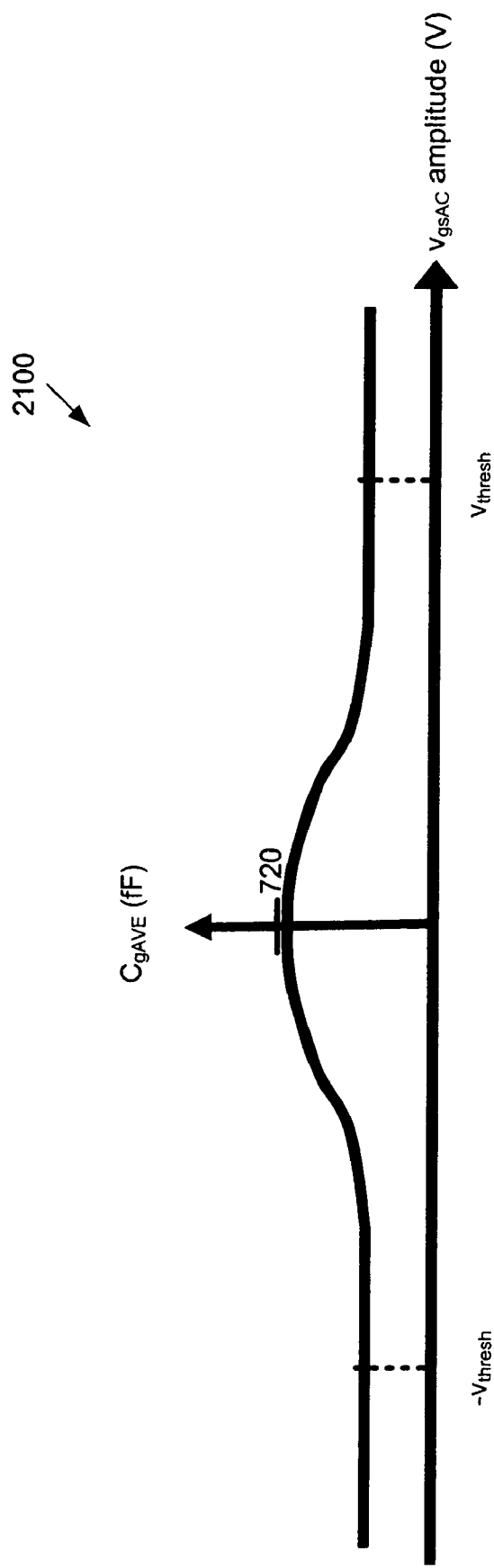

FIG. 21 is a plot or the average input capacitance $C_{gAVE}$ of the PAD shown in FIG. 8 being biased at point A in FIG. 19C according to an embodiment of the present invention.

Figure 22:
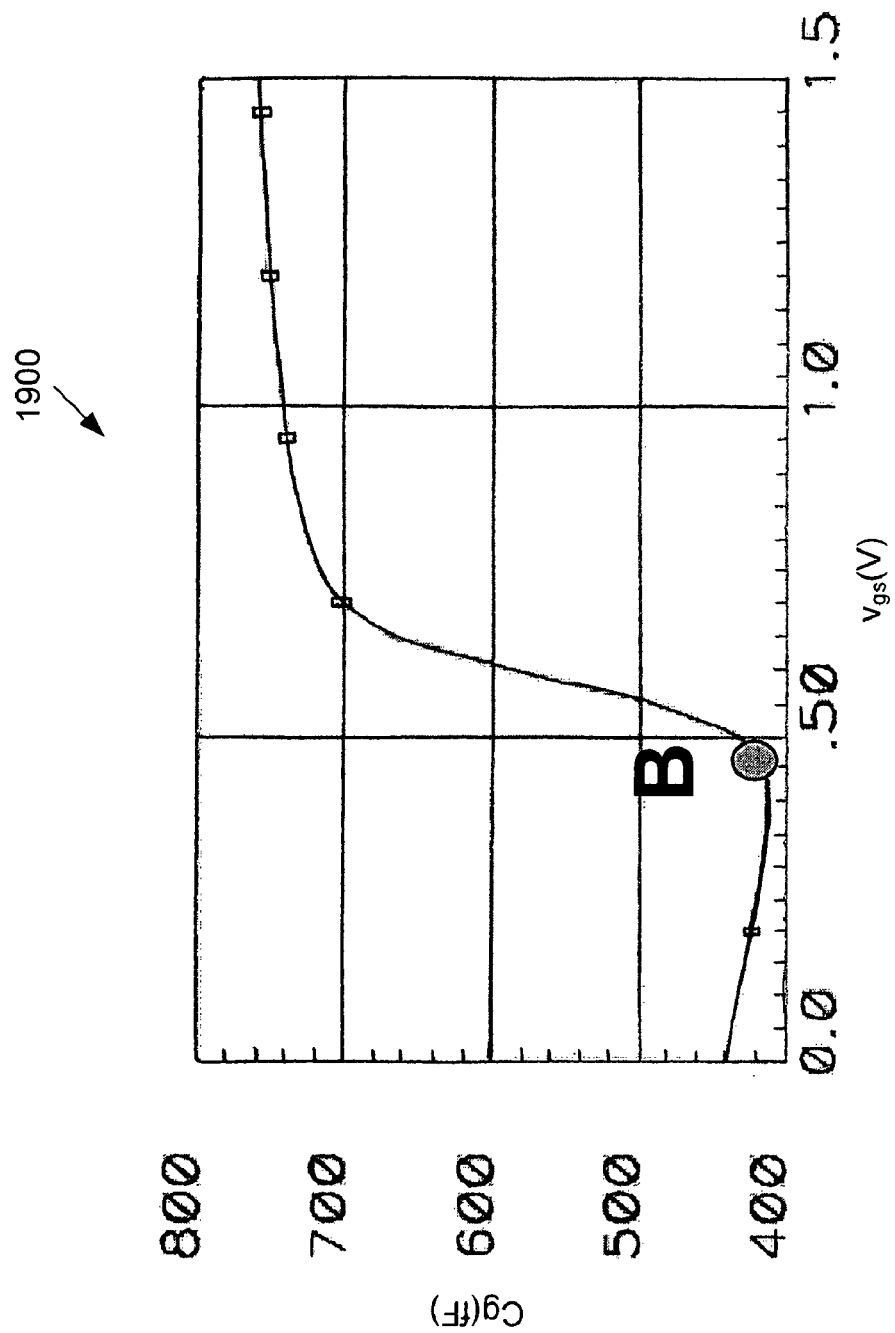

FIG. 22 illustrates an example biasing point B of the PAD shown in FIG. 8 according to an embodiment of the present invention.

Figure 23:
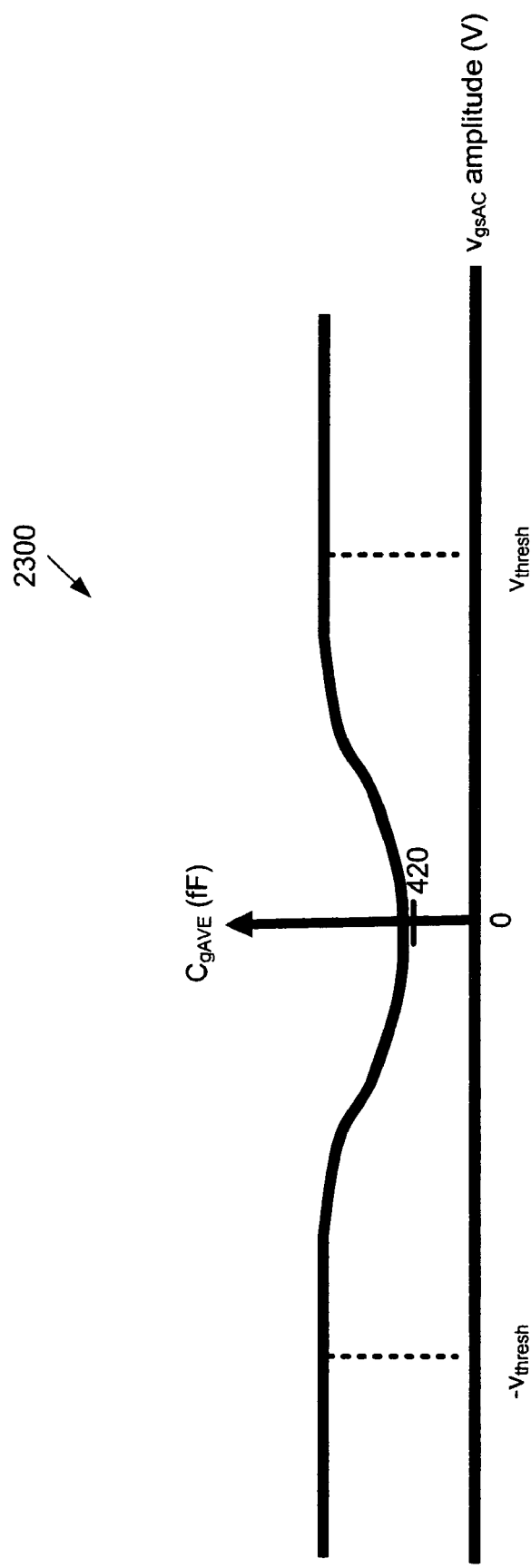

FIG. 23 is a plot of the average input capacitance $C_{gAVE}$ of the PAD shown in FIG. 8 being biased at point B in FIG. 19C according to an embodiment of the present invention.

Figure 24:
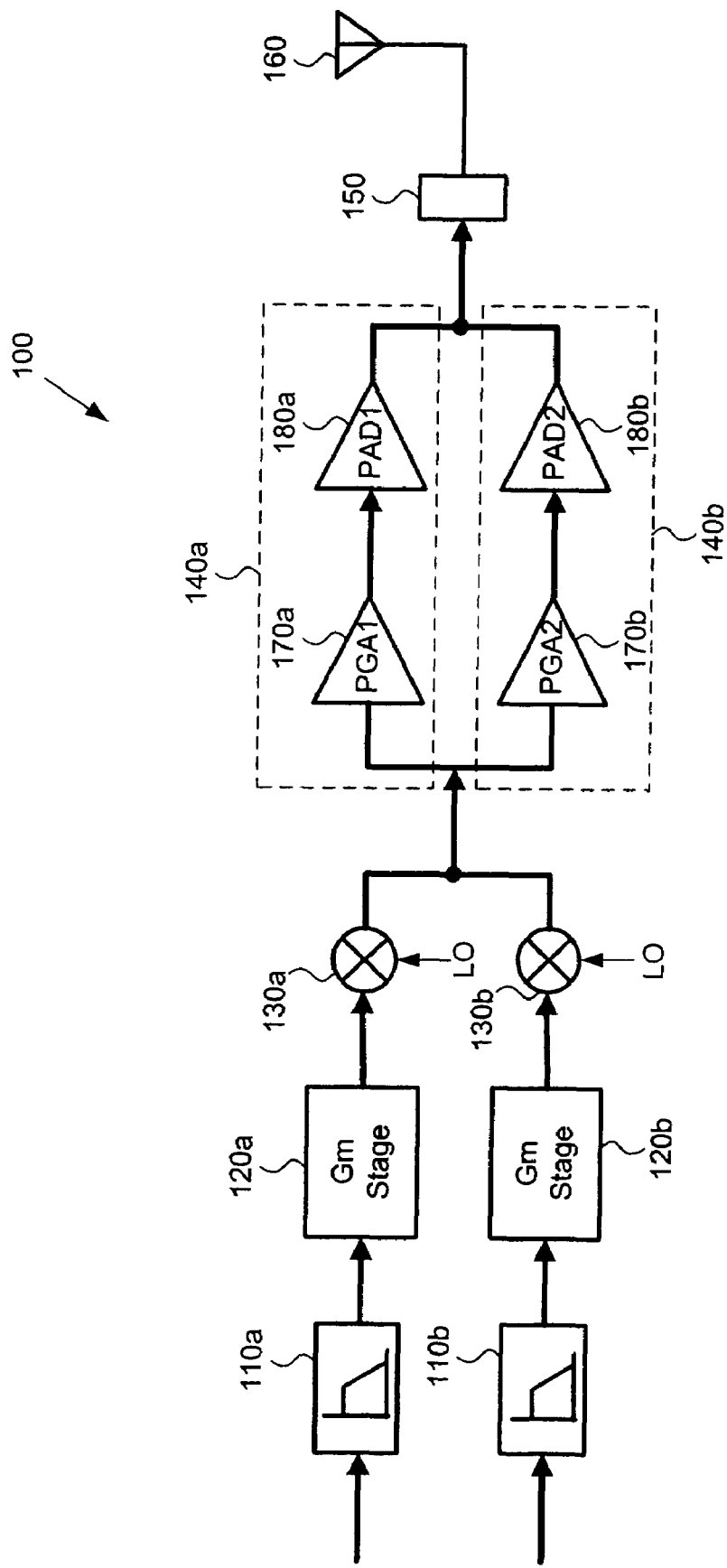

FIG. 24 is a block diagram of the example transmitter shown in FIG. 1 having multiple PGAs and multiple PADs according to an embodiment of the present invention.

Figure 25:
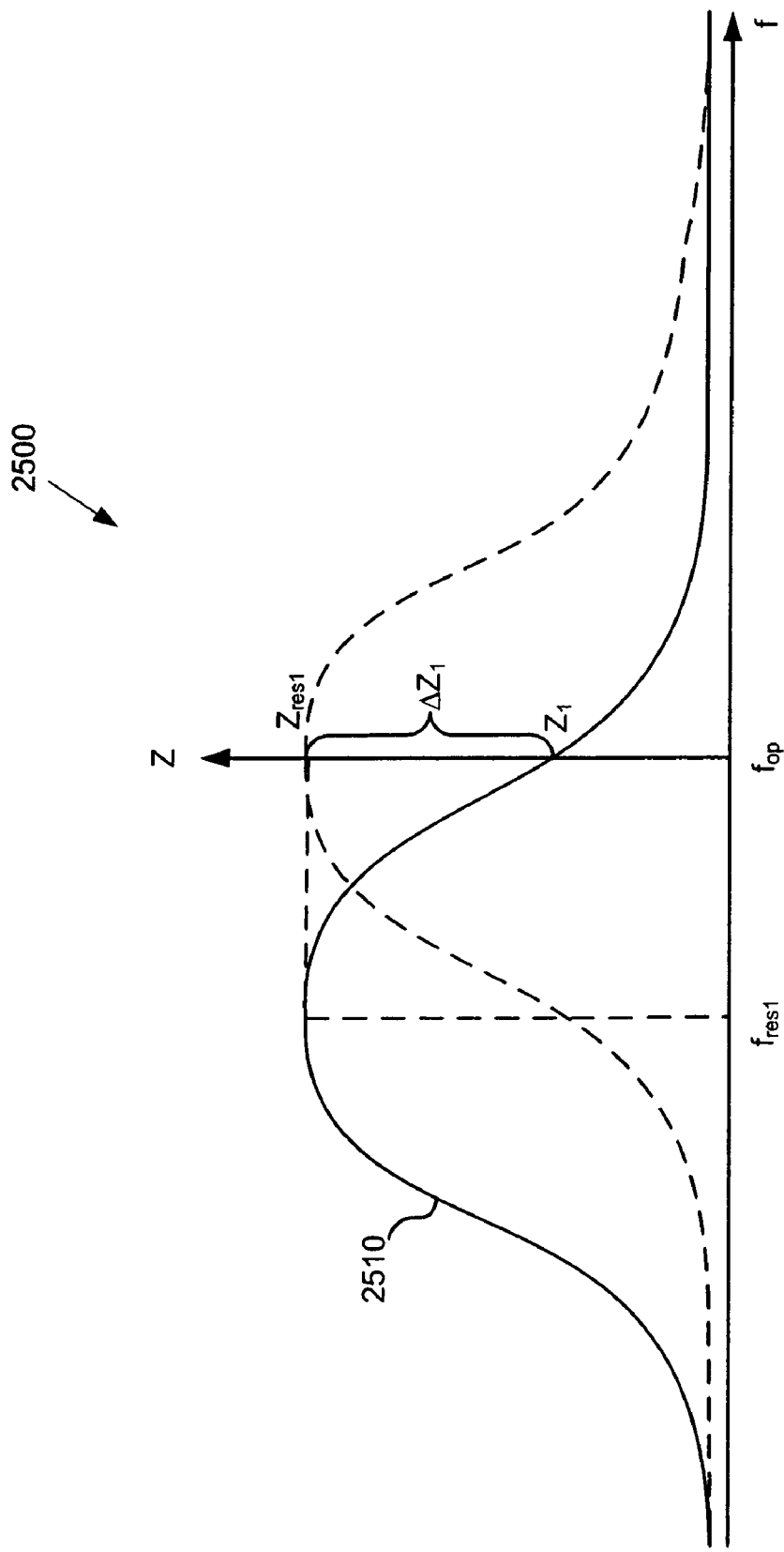

FIG. 25 is a plot of the magnitude response at the output of a first PGA shown in FIG. 24 having $f_{res1} < f_{op}$ according to an embodiment of the present invention.

Figure 26:
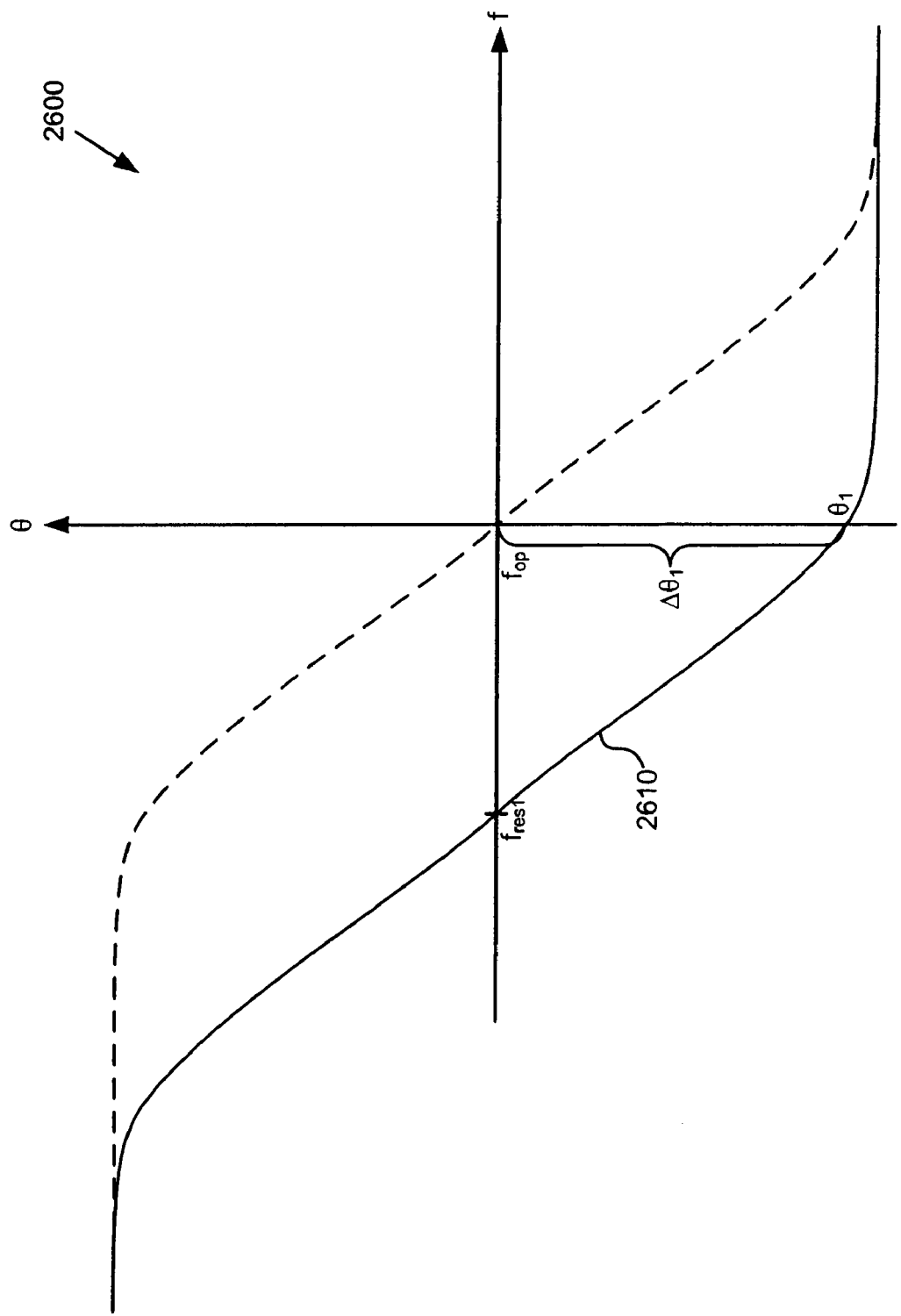

FIG. 26 is a plot of the phase response at the output of the first PGA shown in FIG. 24 having $f_{res1} < f_{op}$ according to an embodiment of the present invention.

Figure 27:
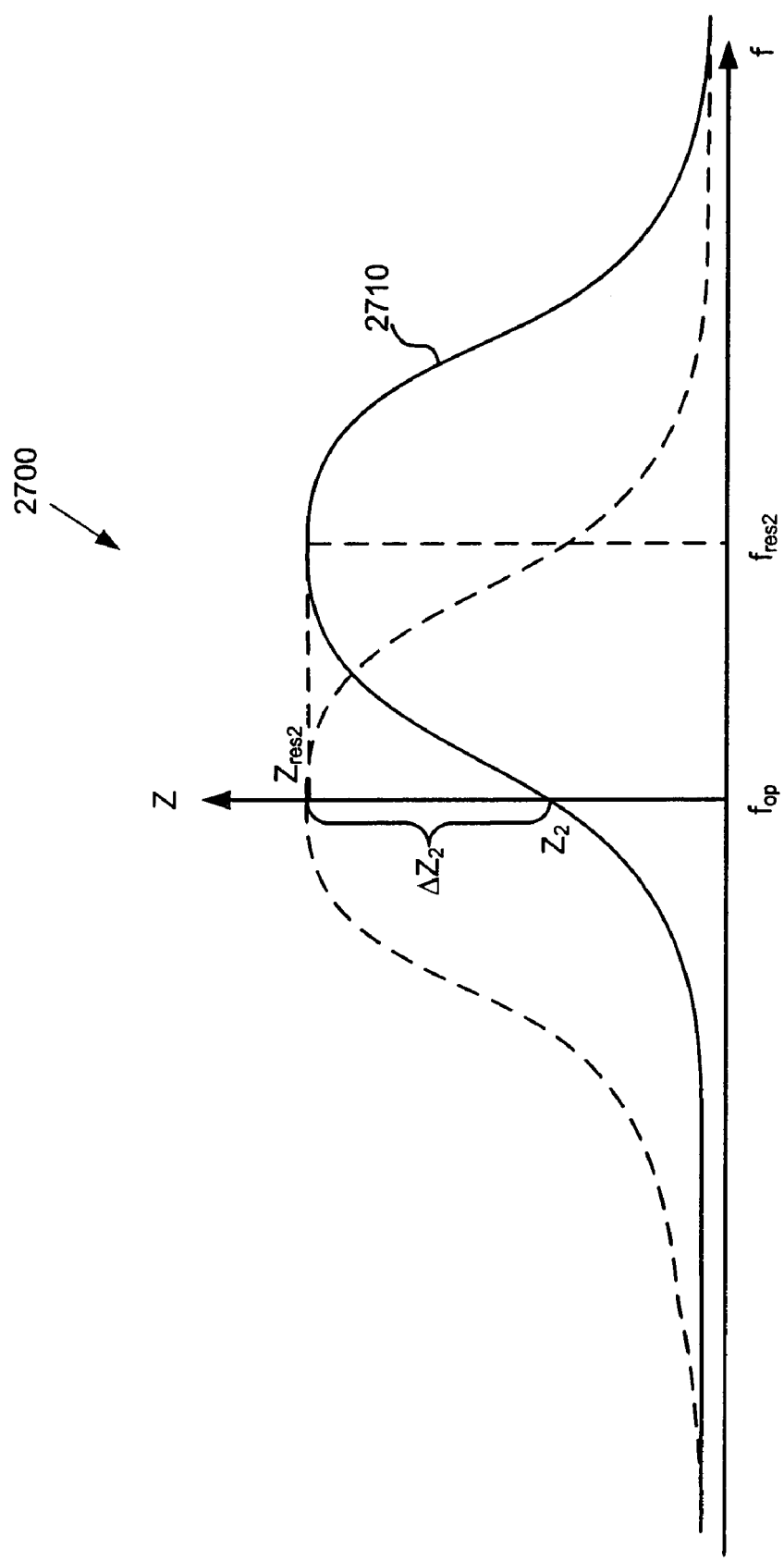

FIG. 27 is a plot of the magnitude response at the output of a second PGA shown in FIG. 24 having $f_{res2} > f_{op}$ according to an embodiment of the present invention.

Figure 28:
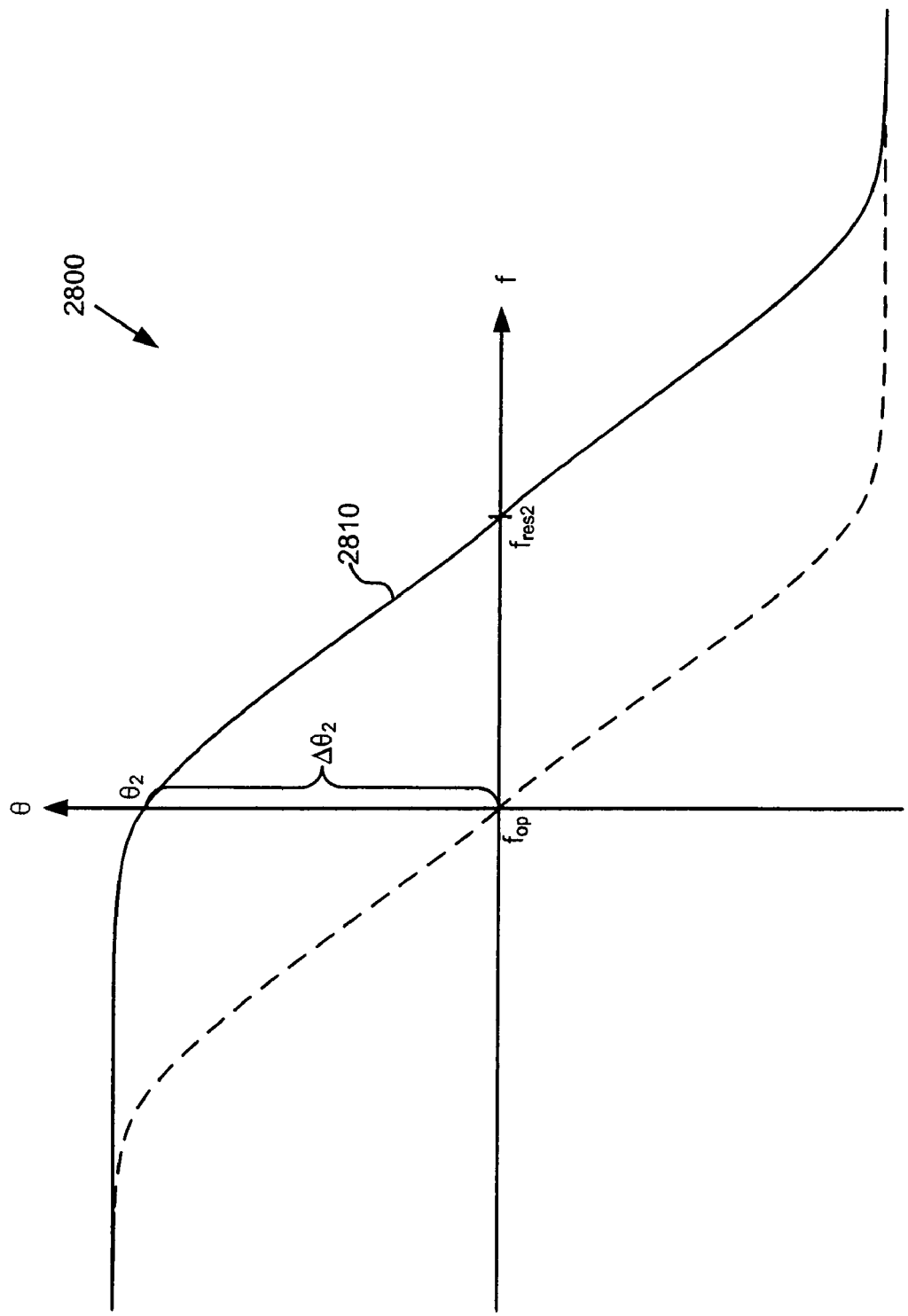

FIG. 28 is a plot of the phase response at the output of the second PGA shown in FIG. 24 having $f_{res2} > f_{op}$ according to an embodiment of the present invention.

Figure 29:
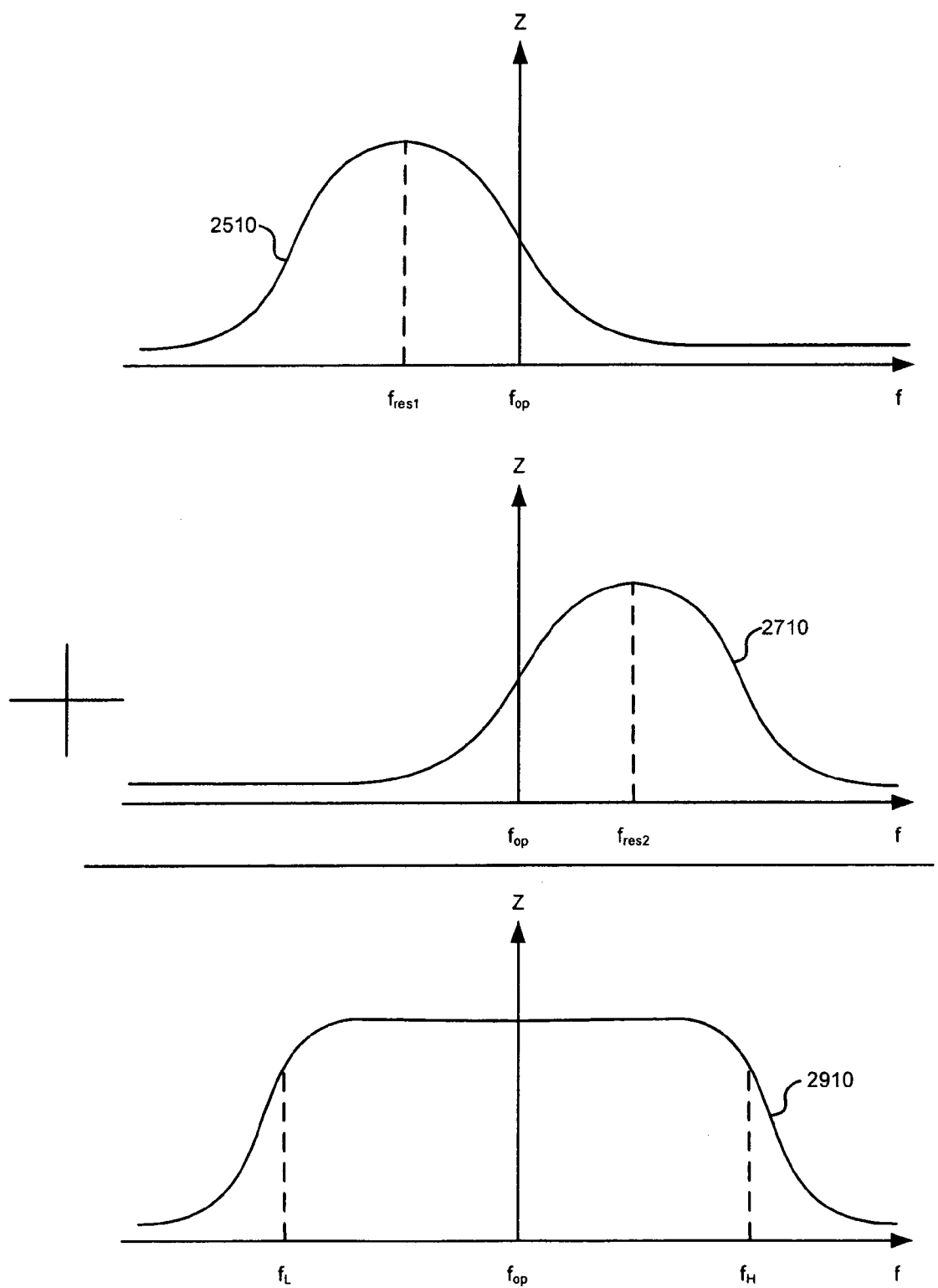

FIG. 29 is a graphical representation of the sum of the magnitude response shown in FIG. 25 and the magnitude response shown in FIG. 27.

Figure 30:
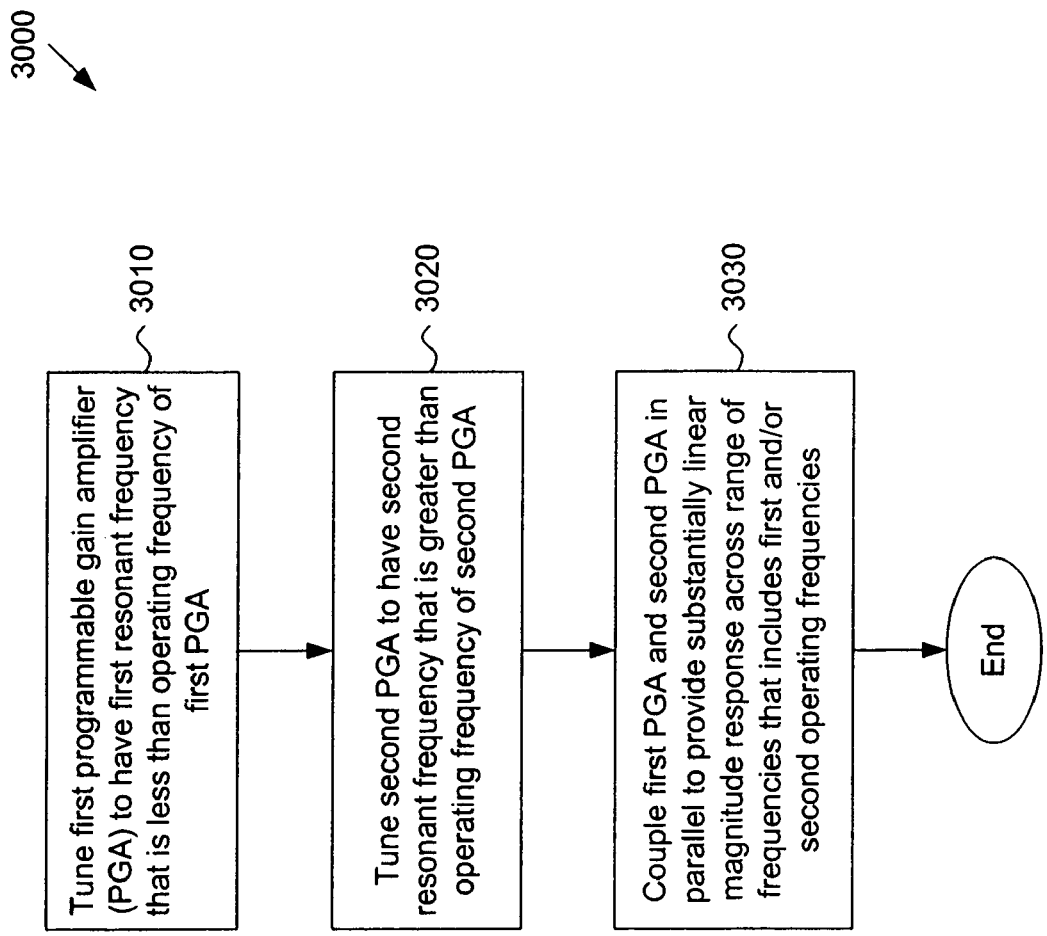

FIG. 30 is a flowchart of a method of providing a substantially linear magnitude response according to an embodiment of the present invention.

DETAILED DESCRIPTION OF THE INVENTION

Although the embodiments of the invention described herein refer specifically, and by way of example, to wireless transmitters, including those designed to be compatible with any one or more of the Institute of Electrical and Electronics Engineers (IEEE) 802.11 wireless local area network (LAN) standards, the IEEE 802.15 wireless personal area network (WPAN) standards, the IEEE 802.16 metropolitan area network (MAN) standards, or the Bluetooth® standard, it will be readily apparent to persons skilled in the relevant art(s) that embodiments of the invention are equally applicable to non-wireless transmitters.

1.0 Overview

FIG. 1 is a block diagram of an example transmitter 100 according to an embodiment of the present invention. Transmitter 100 includes low-pass filters (LPFs) 110a-b, transconductance blocks 120a-b, up-converters 130a-b, amplifier block 140, balun 150, and antenna 160. In FIG. 1, two differential signals are received at low-pass filters 110a-b. The differential signals are the in-phase component (I) and the quadrature component (Q) of the baseband signals. The in-phase and quadrature components can include unwanted adjacent channel energy. Low pass filters 110a-b eliminate or reduce the unwanted energy. Transconductance blocks 120a-b convert the filtered in-phase and quadrature components from voltages to currents.

The in-phase component passes through low-pass filter 110a and transconductance block 120a before being up-converted at up-converter 130a to provide a first RF component. Up-converter 130a mixes the converted in-phase component and a local oscillator signal to generate the first radio frequency (RF) component. The quadrature component passes through low-pass filter 110b and transconductance block 120b before being up-converted at up-converter 130b to provide a second RF component. Up-converter 130b mixes the converted quadrature component and the local oscillator signal to generate the second RF component. The first and second RF components are combined to form the differential modulated RF signal, which is provided to amplifier block 140.

Amplifier block 140 includes programmable gain amplifier (PGA) 170 and power amplifier driver (PAD) 180. The combined RF signal received by PGA 170 has a center frequency, which is referred to as the operating frequency $f_{op}$ of PGA 170 or PAD 180. PGA 170 amplifies the combined RF signal to provide sufficient signal strength to drive PAD 180. PAD 180 amplifies the signal received from PGA 170 to provide sufficient signal strength to drive balun 150. PGA 170 and PAD 180 are configured to charge and discharge respective gate-to-source capacitances quickly enough to provide sufficient power at frequencies near the upper threshold of a passband, for example. Balun 150 converts the differential signal received from PAD 180 to a single-ended signal, which is transmitted by antenna 160.

The single-ended signal transmitted by antenna 160 can be represented by the equation $v_{out} = V[\cos(\omega t + \phi + \phi_2)]$. V is the amplitude/magnitude of the single-ended signal. $\omega$ is the angular frequency of the single-ended signal, where $\omega = 2\pi f$. $f$ is the carrier frequency of the single-ended signal, which is based on the channel via which the single-ended signal travels. $\phi$ is the phase of the single-ended signal. $\phi_2$ is the fixed phase offset introduced by analog processing. $\phi_2$ is the same for all constellation points (described below with reference to FIGS. 2-5) and is hereinafter set to zero to facilitate the following discussion. However, persons skilled in the art will recognize that $\phi_2$ may be non-zero.

The magnitude V and the phase $\phi$ of the single-ended signal correspond to the in-phase (I) and quadrature (Q) components of the baseband signals. The magnitude V can be represented by the equation $V = \sqrt{I^2 + Q^2}$. The phase $\phi$ can be represented by the equation $$\phi = \arctan\left(\frac{Q}{I}\right).$$

The baseband signals corresponding to I and Q can include multiple pairs of in-phase and quadrature components, depending on what type of modulation, if any, is used to modulate the differential signals. Each pair of in-phase and quadrature components corresponds to the single-ended signal transmitted at the antenna 160 having a respective magnitude V and a respective phase $\phi$. The different magnitudes V and associated phases $\phi$ may be mapped using a constellation, such as constellation 200, described below with respect to FIGS. 2-5.

FIG. 2 illustrates a constellation 200 showing a relationship between in-phase (I) and quadrature (Q) components that have been modulated in accordance with a sixteen quadrature amplitude modulation (16 QAM) technique according to an embodiment of the present invention. Constellation 200 includes sixteen points (X), each corresponding to a different pair of in-phase and quadrature components (I,Q). Each pair of in-phase and quadrature components is generated by a different quadrature amplitude modulator (QAM). Transmitter 100 can include any suitable type and/or number of modulators.

Each point in constellation 200 represents a bit combination. The number of bits in a bit combination can be determined by the equation $Y = 2^x$. X is the number of bits in the bit combination, and Y is the corresponding number of points in constellation 200. In the embodiment of FIG. 2, the number of points in constellation 200 is sixteen, and each point provides information corresponding to a combination of four bits. FIG. 2A provides an example table showing the relationship between bit combinations and points in constellation 200 according to an embodiment of the present invention.

The single-ended signal transmitted by antenna 160 includes signal portions, each of which corresponds to a bit combination. For example, if transmitter 100 transmits a single-ended signal that includes information corresponding to bit combinations 0000, 1101, and 0011, the single-ended signal includes a first signal portion having a magnitude V and phase $\phi$ corresponding to constellation point 210a, a second signal portion having a magnitude V and phase $\phi$ corresponding to constellation point 210n, and a third signal portion having a magnitude V and phase $\phi$ corresponding to constellation point 210d. Each signal portion is transmitted for a period of time that is based on the operating frequency $f_{op}$ of PAD 180. Consecutive signal portions may have different magnitudes V and/or phases $\phi$.

Referring back to FIG. 2, a constellation, such as constellation 200, can be used to determine whether the magnitude response and/or the phase response of transmitter 100 are distorted. A distortion occurs when an operating point (X) varies from its desired location in the constellation.

Referring to FIG. 2, point 210f in constellation 200 corresponds to an in-phase component and a quadrature component each having a magnitude of one. Point 210f has a magnitude of $\sqrt{1^2 + 1^2} = \sqrt{2}$ and a phase of $\tan^{-1}(1) = 45°$. Point 210a corresponds to an in-phase component and a quadrature component each having a magnitude of three. Point 210a has a magnitude of $\sqrt{3^2 + 3^2} = 3\sqrt{2}$ and a phase of $\tan^{-1}(1) = 45°$. Because transmitter 100 is configured such that the ratio of the magnitude of point 210a to the magnitude of point 210f is 3:1, a ratio other than 3:1 indicates that transmitter 100 has a non-linear magnitude response (i.e., magnitude distortion). In FIG. 3, the magnitude of point 210a is greater than $3\sqrt{2}$, while the magnitude of point 210f remains $\sqrt{2}$. Thus, the ratio of the magnitude of point 210a to the magnitude of point 210f is greater than 3:1, indicating magnitude distortion.

FIG. 4 illustrates that magnitude distortion can be indicated by a ratio of less than that for which transmitter 100 is configured. In FIG. 4, point 210a is shifted in constellation 200 such that the magnitude of point 210a is less than $3\sqrt{2}$, while the magnitude of point 210f remains $\sqrt{2}$. Thus, the ratio of the magnitude of point 210a to the magnitude of point 210f is less than 3:1, indicating magnitude distortion. In fact, the magnitude distortion in FIG. 4 is so great that point 210a almost overlays point 210f. The magnitude distortion illustrated in FIG. 4 is greater than the magnitude distortion illustrated in FIG. 3 because the variation from the 3:1 ratio is greater in FIG. 4, as compared to the variation shown in FIG. 3.

Points in constellation 200 may be in such close proximity that a receiver is unable to distinguish the points. For instance, in FIG. 4, magnitude distortion of transmitter 100 causes points 210f and 210a to be in close proximity. Referring to FIG. 4, a receiver may not be capable of distinguishing whether in-phase and quadrature RF components associated with point 210f were transmitted or in-phase and quadrature RF components associated with point 210a were transmitted.

FIG. 5 shows that phase distortion of transmitter 100 can cause points of constellation 200 to be indistinguishable. In FIG. 5, the phase of point 210a varies such that point 210a is in close proximity with point 210b. Referring to FIG. 5, a receiver may not be capable of distinguishing whether in-phase and quadrature RF components associated with point 210a are being received or in-phase and quadrature RF components associated with point 210b are being received.

Magnitude distortion and/or phase distortion can be caused by variations in the output impedance of PGA 170 or the input impedance of PAD 180. For example, a change of the output inductance L of PGA 170 can cause a change in the magnitude and/or phase of a constellation point (X). In another example, signal swings at an output of PGA 170 can cause the input capacitance $C_g$ of PAD 180 to vary, thereby shifting one or more points (X) in constellation 200. Different points (X) in constellation 200 can have different magnitude variations and/or different phase variations. Different points (X) can be associated with different input capacitances $C_g$ of PAD 180. Thus, different constellation points (X) can correspond to different loads of PGA 170. A more detailed analysis of PGA 170 and PAD 180 may shed more light on how to improve the magnitude response and/or the phase response of transmitter 100.

2.0 Example PGA/PAD Schematics

FIG. 6 is an example schematic of PGA 170 according to an embodiment of the present invention. PGA 170 includes transistors 610a-d. In FIG. 6, each transistor has a source, a drain, and a gate. A source of transistor 610c is coupled to a drain of transistor 610a. A source of transistor 610d is coupled to a drain of transistor 610b. A source of transistor 610a and a source of transistor 610b are coupled to a ground potential. Gates of transistors 610a and 610b receive the differential modulated RF signal at outputs of up-converters 130a and 130b. Gates of transistors 610c and 610d are coupled to a supply voltage, $V_{dd}$. Drains of transistors 610c-d form a differential output. Transistors 610a-b form a differential pair, and transistors 610c-d are referred to as cascode transistors.

Some example circuit parameters will now be provided for PGA 170 for illustrative purposes. The scope of the present invention is not limited to the circuit parameters provided. The circuit parameters will depend upon the configuration of PGA 170. According to an embodiment, PGA 170 is capable of providing a linear output based on an input voltage of up to 500 mV or more. PGA 170 can have an inductance of approximately 2 nH and a quality factor (Q) of approximately 8.5.

FIG. 7 shows an example plot 700 of the load resistance 710 and the load reactance 720 of PGA 170 according to an embodiment of the present invention. As shown in FIG. 7, PGA 170 can have a resistance of 180Ω and a reactance of 0Ω at approximately 2.5 GHz. In other words, the impedance of PGA 170 at 2.5 GHz can have substantially no imaginary component or a negligible imaginary component.

FIG. 8 is an example schematic of PAD 180 according to an embodiment of the present invention. PAD 180 is configured similarly to PGA 170, described above with respect to FIG. 6, though the scope of the present invention is not limited in this respect. Referring to FIG. 8, PAD 180 includes transistors 810a-d, each having a source, a drain, and a gate. A source of transistor 810c is coupled to a drain of transistor 810a. A source of transistor 810d is coupled to a drain of transistor 810b. A source of transistor 810a and a source of transistor 810b are coupled to a ground potential. A gate of transistor 810a is coupled to the drain of one of transistors 610c and 610d of PGA 170. A gate of transistor 810b is coupled to the drain of the other transistor 610d or 610c of PGA 170. Gates of transistors 810c and 810d are coupled to a supply voltage, $V_{dd}$. Drains of transistors 810c-d form a differential output. Transistors 810a-b form a differential pair, and transistors 810c-d are referred to as cascode transistors.

Below are some example circuit parameters for PAD 180. The scope of the present invention is not limited to the circuit parameters provided. The circuit parameters will depend upon the configuration of PAD 180. According to an embodiment, PAD 180 is capable of providing a linear output based on an input voltage of up to 15 dBm or more. The output of PAD 180 is substantially linear up to a compression point, above which an increase in the input voltage has less effect on the increase of output voltage. PAD 180 can have an inductance of approximately 1.8 nH and a quality factor (Q) of approximately seven or eight. FIG. 9 shows an example plot 900 of the load resistance 910 and the load reactance 920 of PAD 180 according to an embodiment of the present invention. As shown in FIG. 9, PAD 180 can have a load resistance of 200Ω and a load reactance of 0Ω at approximately 2.5 GHz. In other words, the load impedance of PAD 180 at 2.5 GHz can have substantially no imaginary component or a negligible imaginary component.

In FIGS. 6 and 8, transistors 610a-d and 810a-d are metal oxide semiconductor (MOS) transistors for illustrative purposes. Persons skilled in the art will recognize that transistors 610a-d and 810a-d can be any type of transistors and need not be the same type of transistors. Transistors 610a-d and 810a-d may be bipolar junction transistors (BJTs), junction field effect transistors (JFETs), heterojunction field effect transistors (HFETs), metal semiconductor field effect transistors (MESFETs), high electron mobility transistors (HEMTs), pseudomorphic high electron mobility transistors (PHEMTs), modulated doped field effect transistors (MODFETs), two-dimensional electron gas field effect transistors (TEGFETs), selectively doped heterojunction transistors (SDHTs), or complementary heterostructure field effect transistors (CHFETs), or any combination thereof, to provide some examples.

3.0 Example Equivalent Circuit

An analysis of the magnitude response and/or the phase response of transmitter 100 may be facilitated by determining an impedance at the output of PGA 170, which is the same as the input of PAD 180. FIG. 10 is a simplified schematic of amplifier block 140, showing PGA 170 coupled to PAD 180 at terminals 1010a-b according to an embodiment of the present invention. According to the embodiment of FIG. 10, the inductors shown in FIG. 10 resonate out a capacitance associated with outputs On and Op of PGA 170. An equivalent circuit 1000 of amplifier block 140 is provided in FIG. 10A to facilitate a determination of the impedance at the output of PGA 170.

Referring to FIG. 10A, equivalent circuit 1000 includes inductors $L_1$ and $L_2$, resistors $R_1$ and $R_2$, and capacitors $C_{g1}$ and $C_{g2}$. Resistors $R_1$ and $R_2$ are parasitic resistors associated with respective inductors $L_1$ and $L_2$. Capacitors $C_{g1}$ and $C_{g2}$ represent the gate capacitances associated with respective differential inputs of PAD 180.

FIG. 11 is a simplified version of equivalent circuit 1000 of FIG. 10 according to an embodiment of the present invention. In FIG. 11, equivalent circuit 1100 includes differential portions 1120a-b associated with respective terminals 1010a-b. Equivalent circuit 1100 allows a determination of an impedance at each differential terminal 1010a-b of PGA 170. Because the embodiment of FIG. 11 is representative of a differential design, differential portions 1120a-b are the same, and each may be represented by equivalent circuit 1200, as shown in FIG. 12.

4.0 Impedance of Example Equivalent Circuit

Referring to FIG. 12, the impedance at the output of PGA 170 is determined with reference to terminal 1010. L represents the output inductance of PGA 170, and $C_g$ represents the input capacitance (also referred to as the gate capacitance) of PAD 180. R represents a parasitic resistance associated with the output inductance, L, of PGA 170. The impedance associated with $C_g$ is represented by the equation $$Z_C = \frac{1}{j2\pi f_{op} C_g},$$

where $f_{op}$ is the operating frequency of PAD 180. The impedance associated with L is represented by the equation $Z_L = j2\pi f_{op} L$, where $f_{op}$ is the operating frequency of PGA 170. In the embodiment of FIG. 12, PGA 170 and PAD 180 operate at the same frequency. Thus, the operating frequency will be referred to generally hereinafter using the variable $f_{op}$. According to an embodiment of the present invention, the operating frequency $f_{op}$ is approximately 2.4 GHz.

The impedance at the output of PGA 170 is represented by the equation $$Z_{1010} = (R+Z_L) \| Z_C = (R+j2\pi f_{op}L) \| \left(\frac{1}{j2\pi f_{op}C_g}\right) = Z\angle\theta,$$

where Z and θ are the magnitude and phase, respectively, of the impedance $Z_{1010}$ at terminal 1010.

FIG. 13 is a graphical representation of the magnitude Z of the impedance $Z_{1010}$ at the output of PGA 170 with respect to frequency according to an embodiment of the present invention. If the RLC network of equivalent circuit 1200 is optimally tuned at the operating frequency $f_{op}$ of PGA 170 and PAD 180, then the magnitude Z is greatest at the operating frequency $f_{op}$, as shown in FIG. 13. For instance, the input capacitance $C_g$ of PAD 180 and/or the output inductance L of PGA 170 can be adjusted to achieve the magnitude response illustrated in FIG. 13. In FIG. 13, the magnitude response at the output of PGA 170 is depicted as a Gaussian distribution, though the magnitude response can have any suitable shape.

FIG. 14 is a graphical representation of the phase θ of the impedance $Z_{1010}$ at each differential output of PGA 170 with respect to frequency according to an embodiment of the present invention. A phase θ greater than zero corresponds to an impedance that is more inductive than capacitive, and a phase θ less than zero corresponds to an impedance that is more capacitive than inductive. Referring to FIGS. 13 and 14, impedances at frequencies less than $f_{op}$ are more inductive, and impedances at frequencies greater than $f_{op}$ are more capacitive.

In the embodiment of FIG. 14, the phase θ is substantially inversely proportional to frequency (i.e., phase θ decreases with an increase of frequency, and vice versa) in a frequency range that includes the operating frequency $f_{op}$ of PGA 170 and PAD 180. The term "proportional" need not necessarily indicate a linear relationship. For example, proportional can mean a linear relationship or a non-linear relationship. Outside the frequency range that includes the operating frequency $f_{op}$ of PGA 170 and PAD 180, a change in frequency does not substantially effect the phase θ of the impedance $Z_{1010}$ at the output of PGA 170. If the RLC network of equivalent circuit 1200 is optimally tuned at the operating frequency $f_{op}$ of PGA 170 and PAD 180, then the phase θ is substantially zero at the operating frequency $f_{op}$, as shown in FIG. 14.

For example, PGA 170 and/or PAD 180 may be configured such that equivalent circuit 1200 has a resonant frequency $f_{res}$ that is equal to the operating frequency $f_{op}$ of PGA 170 and PAD 180, where the resonant frequency $f_{res}$ is represented by the equation $$f_{res} = \frac{1}{2\pi\sqrt{LC_t}} \approx \frac{1}{2\pi\sqrt{LC_g}}.$$

$C_t$ is the total capacitance at the output of PGA 170. As indicated by the preceding equation, the input capacitance $C_g$ of PAD 180 constitutes most of the total capacitance $C_t$ at the output of PGA 170. For illustrative purposes, the following discussion will assume that the total capacitance $C_t$ at the output of PGA 170 comes entirely from the input capacitance $C_g$ of PAD 180. However, persons skilled in the art will recognize that a difference between $C_t$ and $C_g$ may not be negligible.

In this example, equivalent circuit 1200 is considered to be optimally tuned when $$f_{op} = f_{res} = \frac{1}{2\pi\sqrt{LC_g}}.$$

A variation of the input capacitance $C_g$ of PAD 180 and/or the output inductance L of PGA 170 may vary the resonant frequency $f_{res}$ such that $f_{op} \neq f_{res}$.

FIGS. 15 and 16 are graphical representations of the magnitude response and the phase response, respectively, at the output of PGA 170, where the resonant frequency $f_{res}$ of equivalent circuit 1200 is less than the operating frequency $f_{op}$ of PGA 170 and PAD 180 according to embodiments of the present invention. Referring to FIGS. 15 and 16, the input capacitance $C_g$ of PAD 180 is greater than an optimal value, thereby decreasing the resonant frequency $f_{res}$ of equivalent circuit 1200. The magnitude and phase responses shown in respective FIGS. 15 and 16 are shifted lower in frequency as compared to the magnitude and phase responses shown in respective FIGS. 13 and 14.

In FIG. 15, the optimal magnitude response corresponding to equivalent circuit 1200 having a resonant frequency $f_{res}$ that is equal to the operating frequency $f_{op}$ of PGA 170 and PAD 180 is illustrated by the dashed curve. The magnitude response at the output of PGA 170 corresponding to equivalent circuit 1200 having $f_{res} < f_{op}$ of PGA 170 and PAD 180 is illustrated by the solid curve. As shown by the solid curve, the magnitude Z of the impedance $Z_{1010}$ at the output of PGA 170 is less than an optimal magnitude at the operating frequency $f_{op}$.

In FIG. 16, the optimal phase response corresponding to equivalent circuit 1200 having a resonant frequency $f_{res}$ that is equal to the operating frequency $f_{op}$ of PGA 170 and PAD 180 is illustrated by the dashed curve. The phase response at the output of PGA 170 corresponding to equivalent circuit 1200 having $f_{res} < f_{op}$ of PGA 170 and PAD 180 is illustrated by the solid curve. As shown by the solid curve, the phase θ of the impedance $Z_{1010}$ at the output of PGA 170 is less than the optimal phase of zero at the operating frequency $f_{op}$.

FIGS. 17 and 18 are graphical representations of the magnitude response and the phase response, respectively, at the output of PGA 170, where the resonant frequency $f_{res}$ of equivalent circuit 1200 is greater than the operating frequency $f_{op}$ of PGA 170 and PAD 180 according to embodiments of the present invention. Referring to FIGS. 17 and 18, the input capacitance $C_g$ of PAD 180 is less than an optimal value, thereby increasing the resonant frequency $f_{res}$ of equivalent circuit 1200. The magnitude and phase responses shown in respective FIGS. 17 and 18 are shifted higher in frequency as compared to the magnitude and phase responses shown in respective FIGS. 13 and 14.

In FIG. 17, the optimal magnitude response corresponding to equivalent circuit 1200 having a resonant frequency $f_{res}$ that is equal to the operating frequency $f_{op}$ of PGA 170 and PAD 180 is illustrated by the dashed curve. The magnitude response at the output of PGA 170 corresponding to equivalent circuit 1200 having $f_{res} > f_{op}$ of PGA 170 and PAD 180 is illustrated by the solid curve. As shown by the solid curve, the magnitude Z of the impedance $Z_{1010}$ at the output of PGA 170 is less than an optimal magnitude at the operating frequency $f_{op}$.

In FIG. 18, the optimal phase response corresponding to equivalent circuit 1200 having a resonant frequency $f_{res}$ that is equal to the operating frequency $f_{op}$ of PGA 170 and PAD 180 is illustrated by the dashed curve. The phase response at the output of PGA 170 corresponding to equivalent circuit 1200 having $f_{res} > f_{op}$ of PGA 170 and PAD 180 is illustrated by the solid curve. As shown by the solid curve, the phase θ of the impedance $Z_{1010}$ at the output of PGA 170 is greater than the optimal phase of zero at the operating frequency $f_{op}$.

The input capacitance $C_g$ of PAD 180 may be based on a bias of PAD 180. According to an embodiment, the bias is provided by a voltage source. The bias may be controlled using digital circuitry, analog circuitry, software, firmware, or any combination thereof. In another embodiment, the bias is changed by the output swing of PGA 170. Varying the bias varies the input capacitance $C_g$ of PAD 180, thereby varying the resonant frequency $f_{res}$ of equivalent circuit 1200.

FIG. 19A shows an example biasing configuration of PAD 180 according to an embodiment of the present invention. In FIG. 19A, AC coupling is provided to PAD 180 by connecting outputs On and Op of PGA 170 to input terminals 1960a-b of PAD 180. PAD 180 includes DC blocking capacitors 1910a-b to block respective DC components of outputs On and Op. According to an embodiment, DC blocking capacitors 1910a-b are included in PAD 180, as shown in FIG. 19A. In another embodiment, DC blocking capacitors 1910a-b are external to PAD 180.

Referring to FIG. 19A, DC bias is provided to PAD 180 using DC bias block 1920. DC bias block 1920 includes a current source 1930, a transistor 1940 and resistors 1950a-b. Transistor 1940 is a FET transistor for illustrative purposes, though transistor 1940 may be any type of transistor. Transistor 1940 includes a drain, a gate, and a source. Transistor 1940 is diode coupled, meaning that the drain of transistor 1940 is coupled to the gate of transistor 1940. Current source 1930 provides a DC current to the drain of transistor 1940. The DC current flows across resistors 1950a-b to provide a DC bias to PAD 180. DC bias block 1920 is configured to provide the same DC bias to each input terminal 1960a-b of PAD 180. For example, resistors 1950a-b are configured to have the same resistance as each other.

FIG. 19B is a graphical representation of a bias applied to input terminals 1960a-b of PAD 180 with respect to time according to an embodiment of the present invention. Referring to FIG. 19B, the bias includes the AC bias and the DC bias measured between input terminals 1960a-b and a ground potential. As shown in FIG. 19B, the DC bias applied at input terminals 1910a-b is 0.7V, and the AC bias applied at input terminals 1910a-b is 0.6V peak-to-peak. Thus, the amplitude of the AC bias is 0.3V, and the gate-to-source voltage $v_{gs}$ oscillates between 0.4V and 1.0V.

According to an embodiment, the bias corresponds with a gate-to-source voltage $v_{gs}$ of PAD 180, as shown in FIG. 19A. In the following discussion, the bias will be described with respect to the gate-to-source voltage $v_{gs}$ of PAD 180, though the scope of the invention is not limited in this respect.

FIG. 19C shows an example plot 1900 of a relationship between the input capacitance $C_g$ of PAD 180 and a gate-to-source voltage ($v_{gs}$) of PAD 180 according to an embodiment of the present invention. As illustrated by FIG. 19C, a variation of $v_{gs}$ causes the input capacitance $C_g$ of PAD 180 to change. Changing the input capacitance $C_g$ of PAD 180 causes the resonant frequency $f_{res}$ of equivalent circuit 1200 to change and the impedance $Z_{1010}$ at the output of PGA to change. In an embodiment, a desired bias of PAD 180 is determined by varying the bias and monitoring the input capacitance $C_g$, the resonant frequency $f_{res}$, and/or the impedance $Z_{1010}$.

The input capacitance $C_g$ of PAD 180 is directly proportional to the size of PAD 180. The size of PAD 180 is based on the number of gates that are used to amplify an input signal received by PAD 180, the gate width, and/or the gate length. According to an embodiment, a larger PAD 180 corresponds with a higher input capacitance $C_g$, meaning that a given $v_{gs}$ corresponds with a higher input capacitance $C_g$ for the larger PAD 180.

5.0 Example PGA/PAD Biasing Points

FIG. 20 illustrates an example biasing point A of PAD 180 in plot 1900 of FIG. 19C according to an embodiment of the present invention. Referring to FIG. 20, PAD 180 has a gate-to-source voltage $v_{gs}$ of approximately 0.75V at biasing point A, corresponding to an input capacitance $C_g$ of approximately 720 fF. The gate-to-source voltage $v_{gs}$ is a moving signal having a direct current (DC) component ($v_{gsDC}$) and an alternating current (AC) component ($v_{gsAC}$). The DC and AC components can be any of a variety of values. In the embodiment of FIG. 20, the DC component $v_{gsDC}$ is 0.75V. The AC component $v_{gsAC}$ can be 0.5V, for purposes of illustration. The gate-to-source voltage $v_{gs}$ in FIG. 20, therefore, varies between 0.5V and 1.0V.

As $v_{gs}$ varies from peak to peak, the input capacitance $C_g$ of PAD 180 varies accordingly. In FIG. 20, $V_{gs}=0.5V$ corresponds to $C_g=440$ fF, and $v_{gs}=1.0V$ corresponds to $C_g=740$ fF. Thus, the input capacitance $C_g$ of PAD 180 varies between 440 fF and 740 fF for $v_{gs}=0.75\pm0.25V$.

Referring to FIG. 20, as the amplitude of the AC component $v_{gsAC}$ increases, the average input capacitance $C_{gAVE}$ of PAD 180 decreases, as shown in FIG. 21. For PAD 180 biased at point A, if the amplitude of the AC component $v_{gsAC}$ is zero, then the average input capacitance $C_{gAVE}$ is approximately 720 fF. It can be seen from FIG. 20 that when the AC component $v_{gsAC}$ is non-zero, a positive variation of $v_{gs}$ from biasing point A results in a relatively slight increase in $C_g$, and a corresponding negative variation of $v_{gs}$ results in a relatively substantial decrease in $C_g$. The average input capacitance $C_{gAVE}$ of PAD 180 progressively decreases as the amplitude of the AC component $v_{gsAC}$ is increased, until a biasing threshold is reached.

The biasing threshold corresponds with a stationary point of plot 1900. A stationary point is defined as a point on a curve at which the derivative of the function that defines the curve equals zero (i.e., a point on the curve at which the slope of the curve is zero). The term "stationary point" as used herein is further defined to include a point at which the slope of the curve is approximately zero and a point on the curve at which the slope is substantially less than the slope at other points on the curve.

In FIG. 20, the biasing threshold corresponds to the point in plot 1900 below which the slope of plot 1900 substantially decreases. The slope of plot 1900 substantially decreases when the gate-to-source voltage $v_{gs}$ of PAD 180 reaches approximately 0.45V. Thus, the point on plot 1900 that corresponds with $v_{gs}$=0.45V can be referred to as the lower biasing threshold of PAD 180.

In the embodiment of FIG. 20, the average input capacitance $C_{gAVE}$ begins to increase as the gate-to-source voltage $v_{gs}$ swings below approximately 0.45V. The AC component amplitude threshold $v_{thresh}$ is determined by subtracting the gate-to-source voltage $v_{gs}$ at the lower biasing threshold from the gate-to-source voltage $v_{gs}$ at biasing point A. In FIG. 20, the AC component amplitude threshold is 0.75V−0.45V=0.3V and is labeled in FIG. 21 as $V_{thresh}$.

FIG. 22 illustrates an example biasing point B of PAD 180 in plot 1900 of FIG. 19C according to an embodiment of the present invention. Referring to FIG. 22, PAD 180 has a gate-to-source voltage $v_{gs}$ of approximately 0.45V at biasing point B, corresponding to an input capacitance $C_g$ of approximately 420 fF. The gate-to-source voltage $v_{gs}$ has a DC component $v_{gsDC}$ of 0.45V. For the purposes of illustration, the gate-to-source voltage $v_{gs}$ can have an AC component $v_{gsAC}$ of 0.5V. The gate-to-source voltage $v_{gs}$ in FIG. 22, therefore, varies between 0.2V and 0.7V.

As $v_{gs}$ varies from peak to peak, the input capacitance $C_g$ of PAD 180 varies accordingly. In FIG. 22, $v_{gs}$=0.2V corresponds to $C_g$=420 fF, and $v_{gs}$=0.7V corresponds to $C_g$=700 fF. Thus, the input capacitance $C_g$ of PAD 180 varies between 420 fF and 700 fF for $v_{gs}$=0.45±0.25V.

Referring to FIG. 22, as the amplitude of the AC component $v_{gsAC}$ increases, the average input capacitance $C_{gAVE}$ of PAD 180 increases, as shown in FIG. 23. For PAD 180 biased at point B, if the amplitude of the AC component $v_{gsAC}$ is zero, then the average input capacitance $C_{gAVE}$ is approximately 420 fF. It can be seen from FIG. 22 that when the AC component $v_{gsAC}$ is non-zero, a positive variation of $v_{gs}$ results in a relatively substantial increase in $C_g$, and a corresponding negative variation of $v_{gs}$ from biasing point B results in a relatively negligible change in $C_g$. The average input capacitance $C_{gAVE}$ of PAD 180 progressively increases as the amplitude of the AC component $v_{gsAC}$ is increased, until a biasing threshold is reached.

In FIG. 22, the biasing threshold corresponds to the point in plot 1900 above which the slope of plot 1900 substantially decreases. The slope of plot 1900 substantially decreases when the gate-to-source voltage $v_{gs}$ of PAD 180 reaches approximately 0.75V. Thus, the point on plot 1900 that corresponds with $v_{gs}$=0.75V can be referred to as the upper biasing threshold of PAD 180.

In the embodiment of FIG. 22, the input capacitance $C_{gAVE}$ of PAD 180 does not increase substantially for gate-to-source voltages greater than approximately 0.75V. The AC component amplitude threshold $V_{thresh}$ is determined by subtracting the gate-to-source voltage $v_{gs}$ at biasing point B from the gate-to-source voltage $v_{gs}$ at the point in plot 1900 above which the slope of plot 1900 substantially decreases. In FIG. 22, the AC component amplitude threshold is 0.75V−0.45V=0.3V and is labeled in FIG. 23 as $v_{thresh}$. The AC component amplitude thresholds corresponding to biasing points A and B in FIGS. 20 and 22 need not necessarily be the same, though they are the same in this instance.

6.0 Embodiments Having Multiple PGAs

Nonlinearities associated with the magnitude response and/or the phase response of transmitter 100 can be reduced or eliminated in any of a variety of ways. According to an embodiment, transmitter 100 includes multiple PGAs to provide a more linear magnitude response and/or phase response. For example, the sensitivity of the phase response of transmitter 100 to changes in the load of the PGAs can be reduced by tuning each PGA to have a resonant frequency that is not equal to the operating frequency of the respective PGA. In another example, tuning PGAs to have different resonant frequencies can provide a linear magnitude response across a range of frequencies.

FIG. 24 is a block diagram of transmitter 100 having multiple PGAs 170a-b and multiple PADs 180a-b according to an embodiment of the present invention. As shown in FIG. 24, PGA 170a and PAD 180a are included in amplifier block 140a. PGA 170b and PAD 180b are included in amplifier block 140b. Amplifier blocks 140a and 140b are connected in parallel with each other. In the embodiment of FIG. 24, PGAs 170a-b have a common bias, and PADs 180a-b have a common bias, though the scope of the invention is not limited in this respect.

Referring to FIG. 24, PGA 170a is tuned to have a resonant frequency $f_{res1}$ that is less than the operating frequency $f_{op1}$ of PGA 170a, and PGA 170b is tuned to have a resonant frequency $f_{res2}$ that is greater than the operating frequency $f_{op2}$ of PGA 170b. In FIG. 24, PGA 170a and PGA 170b are configured to operate at the same operating frequency, $f_{op}$=$f_{op1}$=$f_{op2}$. Thus, PGA 170a is tuned to have $f_{res1}$<$f_{op}$, and PGA 170b is tuned to have $f_{res2}$>$f_{op}$.

In FIG. 24, PGAs 170a-b have respective output inductances $L_1$ and $L_2$, and PADs 180a-b have respective input capacitances $C_{g1}$ and $C_{g2}$. The resonant frequency $f_{res1}$ of PGA 170a may be adjusted by changing the output inductance $L_1$ of PGA 170a and/or the input capacitance $C_{g1}$ of PAD 180a. The resonant frequency $f_{res2}$ of PGA 170b may be adjusted by changing the output inductance $L_2$ of PGA 170b and/or the input capacitance $C_{g2}$ of PAD 180b. For example, increasing the output inductance $L_1$ of PGA 170a and/or the input capacitance $C_{g1}$ of PAD 180a may decrease the resonant frequency $F_{res1}$ of PGA 170a. In another example, decreasing the output inductance $L_2$ of PGA 170b and/or the input capacitance $C_{g2}$ of PAD 180b may increase the resonant frequency $f_{res2}$ of PGA 170b.

The input inductance $L_1$ or $L_2$ necessary to achieve a respective resonant frequency $f_{res1}$ or $f_{res2}$ may be determined using the equation $$L = \frac{1}{4\pi^2 f^2 C_g}.$$

For example, $L_1$ may be determined by setting $f$=$f_{res1}$ and $C_g$=$C_{g1}$. In another example, $L_2$ may be determined by setting $f$=$f_{res2}$ and $C_g$=$C_{g2}$.

According to an embodiment, an input capacitance $C_{g1}$ or $C_{g2}$ is selected, and a respective output inductance $L_1$ or $L_2$ is selected based on the respective input capacitance $C_{g1}$ or $C_{g2}$. For example, a gate-to-source voltage $v_{gs1}$ may be applied to PAD 180a to achieve a first biasing point on plot 1900 of FIG. 19. The output inductance $L_1$ of PGA 170a may be tuned to achieve resonant frequency $f_{res1}$, based on the input capacitance $C_{g1}$ that corresponds to the first biasing point. In another example, a gate-to-source voltage $v_{gs2}$ may be applied to PAD 180b to achieve a second biasing point on plot 1900 of FIG. 19. The output inductance $L_2$ of PGA 170b may be tuned to achieve resonant frequency $f_{res2}$, based on the input capacitance $C_{g2}$ that corresponds to the second biasing point. In an alternative embodiment, the output inductance $L_1$ or $L_2$ is selected, and the respective input capacitance $C_{g1}$ or $C_{g2}$ is selected based on the respective output inductance $L_1$ or $L_2$.

In an embodiment, PGAs 170a-b are each configured to operate at a frequency of approximately 2.4 GHz. PGA 170a may be tuned to have a resonant frequency $f_{res1}$ of approximately 2 GHz. Assuming $C_{g1}$=1 pF in this example, $$L_1 = \frac{1}{4\pi^2(2\times 10^9)^2 10^{-12}} = 6.33 \times 10^{-9} = 6.33\, nH.$$

PGA 170b may be tuned to have a resonant frequency $f_{res2}$ of approximately 3 GHz. Assuming $$C_{g2} = 1\, pF,\ L_2 = \frac{1}{4\pi^2(3\times 10^9)^2 10^{-12}} = 2.81 \times 10^{-9} = 2.81\, nH.$$

$C_{g1}$ and $C_{g2}$ are dependent on characteristics of respective PADs 180a-b, such as the size of PADs 180a-b. $C_{g1}$ and $C_{g2}$ need not necessarily be the same. PGAs 170a-b may be configured to have any of a variety of resonant frequencies $f_{res1}$ and $f_{res2}$.

FIG. 25 is a plot 2500 of the magnitude response 2510 at the output of PGA 170a having $f_{res1}<f_{op}$ according to an embodiment of the present invention. As shown in FIG. 25, magnitude response 2510 is at a maximum at $f_{res1}$. A signal swing about the gate-to-source voltage ($v_{gs1}$) of PAD 180a varies the input capacitance $C_{g1}$ of PAD 180a, providing an average input capacitance $C_{gAVE1}$ for PAD 180a. The varying input capacitance $C_{g1}$ of PAD 180a causes the resonant frequency $f_{res1}$ of PAD 180a to vary. Referring to FIG. 25, of the signal swing about $v_{gs1}$ causes magnitude response 2510 to shift left and right in plot 2500. In FIG. 25, the slope of magnitude response 2510 is non-zero at $f_{op}$, though the scope of the invention is not limited in this respect. In the embodiment of FIG. 25, the magnitude distortion $\Delta Z_1$ at the output of PGA 170a at $f_{op}$ is the difference between the magnitude response $Z_1$ at $f_{op}$ and the magnitude response $Z_{res1}$ at $f_{res1}$.

FIG. 26 is a plot 2600 of the phase response 2610 at the output of PGA 170a having $f_{res1}<f_{op}$ according to an embodiment of the present invention. The phase distortion $\Delta \theta_1$ at the output of PGA 170a is the difference between the phase response $\theta_1$ at $f_{op}$ and the phase response at $f_{res1}$. In the embodiment of FIG. 26, phase response 2610 is zero at $f_{res1}$. Thus, phase distortion $\Delta\theta_1 = \theta_1$ at $f_{op}$. A signal swing about $v_{gs1}$ of PAD 180a causes phase response 2610 to shift left and right in plot 2600. The sensitivity of phase response 2610 at $f_{res1}$ is less for PGA 170a having $f_{res1}<f_{op}$, as compared to a PGA having $f_{res1}=f_{op}$. For example, the phase distortion associated with the signal swing about $v_{gs1}$ at $f_{op}$ may be negligible and/or substantially zero.

FIG. 27 is a plot 2700 of the magnitude response 2710 at the output of PGA 170b having $f_{res2}>f_{op}$ according to an embodiment of the present invention. As shown in FIG. 27, magnitude response 2710 is at a maximum at $f_{res2}$. A signal swing about the gate-to-source voltage ($v_{gs2}$) of PAD 180b varies the input capacitance $C_{g2}$ of PAD 180b, providing an average input capacitance $C_{gAVE2}$ for PAD 180b. The varying input capacitance $C_{g2}$ of PAD 180b causes the resonant frequency $f_{res2}$ of PGA 170b to vary. Referring to FIG. 27, of the signal swing about $v_{gs2}$ causes magnitude response 2710 to shift left and right in plot 2700. In FIG. 27, the slope of magnitude response 2710 is non-zero at $f_{op}$, though the scope of the invention is not limited in this respect. In the embodiment of FIG. 27, the magnitude distortion $\Delta Z_2$ at the output of PGA 170b at $f_{op}$ is the difference between the magnitude response $Z_2$ at $f_{op}$ and the magnitude response $Z_{res2}$ at $f_{res2}$.

FIG. 28 is a plot 2800 of the phase response 2810 at the output of PGA 170b having $f_{res2}>f_{op}$ according to an embodiment of the present invention. The phase distortion $\Delta\theta_2$ at the output of PGA 170b is the difference between the phase response $\theta_2$ at $f_{op}$ and the phase response at $f_{res2}$. In the embodiment of FIG. 28, phase response 2810 is zero at $f_{res2}$. Thus, phase distortion $\Delta\theta_2=\theta_2$ at $f_{op}$. A signal swing about $V_{gs2}$ of PAD 180b causes phase response 2810 to shift left and right in plot 2800. The sensitivity of phase response 2810 at $f_{res2}$ is less for PGA 170b having $f_{res2}>f_{op}$, as compared to a PGA having $f_{res2}=f_{op}$. For example, the phase distortion associated with the signal swing about $v_{gs2}$ at $f_{op}$ may be negligible and/or substantially zero.

FIG. 29 is a graphical representation of the sum of magnitude response 2510 shown in FIG. 25 and magnitude response 2710 shown in FIG. 27. In FIG. 29, magnitude response 2510 at the output of PGA 170a and magnitude response 2710 at the output of PGA 170b are combined to provide combined magnitude response 2910. As illustrated by FIG. 29, tuning PGA 170a to have resonant frequency $f_{res1}<f_{op}$ and tuning PGA 170b to have resonant frequency $f_{res2}>f_{op}$ provides a substantially linear magnitude response over a frequency range for transmitter 100. The frequency range is defined by a lower frequency $f_L$ and an upper frequency $f_H$. According to an embodiment, the operating frequency $f_{op}$ is midway between $f_L$ and $f_H$. For example, the operating frequency $f_{op}$ may be represented by the equation $$f_{op} = \frac{f_L + f_H}{2}.$$

According to an embodiment, PGA 170a compensates for a gain loss (i.e., magnitude loss) at the output of PGA 170b, or vice versa. In FIG. 29, magnitude response 2710 at $f_{op}$ is less than magnitude response 2710 at $f_{res1}$, evidencing a magnitude loss at $f_{op}$. Magnitude response 2510 is non-zero at $f_{op}$. Combining magnitude responses 2510 and 2710 provides combined magnitude response 2910 that is greater than magnitude response 2710 at $f_{op}$. PGA 170a thereby compensates for the gain loss at the output of PGA 170b.

Referring to FIG. 29, magnitude response 2510 has a negative slope at $f_{op}$, and magnitude response 2710 has a positive slope at $f_{op}$. Combining magnitude response 2510 and magnitude response 2710 provides magnitude response 2910 having a slope of substantially zero at $f_{op}$. In FIG. 29, magnitude response 2910 has a slope of approximately zero across the frequency range defined by $f_L$ and $f_H$. According to an embodiment, $f_L$ and $f_H$ are defined as points on magnitude response 2910 at which an absolute value of the slope of magnitude response 2910 exceeds a threshold.

Phase response 2610 at the output of PGA 170a and phase response 2810 at the output of PGA 170b may be combined to provide a combined phase response that is substantially linear across the frequency range defined by $f_L$ and $f_H$. According to an embodiment, the combined phase response is substantially insensitive to a variation of the input capacitance $C_{g1}$ of PAD 180a and/or of the input capacitance $C_{g2}$ of PAD 180b. Loading of PGA 170a and/or PGA 170b may not negatively effect the combined phase response.

Flowchart 3000 illustrates a method of providing a substantially linear magnitude response. The invention, however, is not limited to the description provided by flowchart 3000. Rather, it will be apparent to persons skilled in the relevant art(s) from the teachings provided herein that other functional flows are within the scope and spirit of the present invention.

Flowchart 3000 will be described with continued reference to example transmitter 100 described above in reference to FIGS. 1 and 24, though the method is not limited to those embodiments.

Referring now to FIG. 30, first PGA 170a is tuned at block 3010 to have a first resonant frequency that is less than an operating frequency of the first PGA 170a. Second PGA 170b is tuned at block 3020 to have a second resonant frequency that is greater than an operating frequency of the second PGA 170b. As shown in block 3030, first PGA 170a and second PGA 170b are coupled in parallel to provide a substantially linear magnitude response across a range of frequencies that includes the first and/or second operating frequencies.

Coupling first PGA 170a and second PGA 170b in parallel at block 3030 may facilitate combining a first non-linear magnitude response at an output of first PGA 170a and a second non-linear magnitude response at an output of second PGA 170b.

According to an embodiment, the first and second operating frequencies are the same. Tuning first PGA 170a at block 3010 may provide a non-zero magnitude distortion at the output of first PGA 170a at the operating frequency. Tuning second PGA 170b at block 3020 may provide a non-zero magnitude distortion at the output of second PGA 170b at the operating frequency. Coupling first PGA 170a and second PGA 170b in parallel at block 3030 may provide a magnitude distortion of approximately zero at the operating frequency.

In an embodiment, tuning first PGA 170a at block 3010 includes selecting an output inductance of first PGA 170a to provide the first resonant frequency, and tuning second PGA 170b at block 3020 includes selecting an output inductance of second PGA 170b to provide the second resonant frequency.

The method includes biasing the first PAD 170a and the second PAD 170b, according to an embodiment. First PAD 170a and second PAD 170b may be biased to have substantially the same input capacitance. First and second PADs 170a-b may be biased independently. In the alternative, first and second PADs 170a-b may be biased using a common bias. Biasing first and second PADs 170a-b may include applying respective gate-to-source voltages to first and second PADs 170a-b.

7.0 CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A transmitter comprising:
    a first programmable gain amplifier (PGA) having a first resonant frequency that is less than an operating frequency of the first PGA; and
    a second PGA having a second resonant frequency that is greater than the operating frequency, wherein the first PGA and the second PGA are coupled together to provide a substantially linear response across a range of frequencies that includes the operating frequency.

2. The transmitter of claim 1, wherein the first PGA and the second PGA are coupled in parallel.

3. The transmitter of claim 1, wherein the substantially linear response includes a substantially linear magnitude response.

4. The transmitter of claim 1, wherein the substantially linear response includes a substantially linear phase response.

5. The transmitter of claim 1, wherein the substantially linear response is a sum of a first non-linear response at an output of the first PGA and a second non-linear response at an output of the second PGA.

6. The transmitter of claim 1, wherein a distortion at an output of the first PGA at the operating frequency is non-zero, and wherein a distortion at an output of the second PGA at the operating frequency is non-zero, and wherein the first PGA and the second PGA are coupled together to provide a distortion of approximately zero at the operating frequency.

7. The transmitter of claim 1, wherein the first PGA is configured to have an output inductance that corresponds with the first resonant frequency, and wherein the second PGA is configured to have an output inductance that corresponds with the second resonant frequency.

8. The transmitter of claim 1, wherein the operating frequency is approximately 2.4 GHz.

9. The transmitter of claim 1, wherein the first resonant frequency is approximately 2 GHz, and wherein the second resonant frequency is approximately 3 GHz.

10. The transmitter of claim 1, wherein the first PGA is coupled in series with a first power amplifier driver (PAD) in a first amplifier block, and wherein the second PGA is coupled in series with a second PAD in a second amplifier block that is coupled in parallel with the first amplifier block.

11. The transmitter of claim 1, wherein the operating frequency is a center frequency of a signal received by the first PGA and the second PGA.

12. A method comprising:
    tuning a first programmable gain amplifier (PGA) to have a first resonant frequency that is less than an operating frequency of the first PGA;
    tuning a second PGA to have a second resonant frequency that is greater than the operating frequency; and
    coupling the first PGA and the second PGA together to provide a substantially linear response across a range of frequencies that includes the operating frequency.

13. The method of claim 12, wherein coupling the first PGA and the second PGA together includes coupling the first PGA and the second PGA in parallel.

14. The method of claim 12, wherein coupling the first PGA and the second PGA together is performed to provide a substantially linear magnitude response.

15. The method of claim 12, wherein coupling the first PGA and the second PGA together is performed to provide a substantially linear phase response.

16. The method of claim 12, wherein coupling the first PGA and the second PGA together includes summing a first non-linear response at an output of the first PGA and a second non-linear response at an output of the second PGA.

17. The method of claim 12, wherein tuning the first PGA provides a non-zero distortion at an output of the first PGA at the operating frequency, and wherein tuning the second PGA provides a non-zero distortion at an output of the second PGA at the operating frequency, and wherein coupling the first PGA and the second PGA together provides a distortion of approximately zero at the operating frequency.

18. The method of claim 12, wherein tuning the first PGA includes configuring the first PGA to have an output inductance that corresponds with the first resonant frequency, and wherein tuning the second PGA includes configuring the second PGA to have an output inductance that corresponds with the second resonant frequency.

19. The method of claim 12, wherein the operating frequency is approximately 2.4 GHz.

20. The method of claim 12, wherein tuning the first PGA includes tuning the first PGA to have the first resonant frequency of approximately 2 GHz, and wherein tuning the second PGA includes tuning the second PGA to have the second resonant frequency of approximately 3 GHz.

21. The method of claim 12, further comprising:
coupling the first PGA in series with a first power amplifier driver (PAD) to provide a first amplifier block;
coupling the second PGA in series with a second PAD to provide a second amplifier block; and
coupling the first amplifier block and the second amplifier block in parallel.

22. The method of claim 12, wherein the operating frequency is a center frequency of a signal received by the first PGA and the second PGA.

23. A transmitter comprising:
a first programmable gain amplifier (PGA) having a first resonant frequency that is less than a first operating frequency of the first PGA; and
a second PGA having a second resonant frequency that is greater than a second operating frequency of the second PGA, wherein the first PGA and the second PGA are coupled together to provide a substantially linear response across a plurality of frequencies that includes at least one of the first operating frequency and the second operating frequency.

24. The transmitter of claim 23, wherein the first operating frequency and the second operating frequency are same.

25. The transmitter of claim 23, wherein the first PGA and the second PGA are coupled in parallel.

26. The transmitter of claim 23, wherein the substantially linear response includes a substantially linear magnitude response.

27. The transmitter of claim 23, wherein the substantially linear response includes a substantially linear phase response.

28. The transmitter of claim 23, wherein the substantially linear response is a sum of a first non-linear response at an output of the first PGA and a second non-linear response at an output of the second PGA.

29. The transmitter of claim 23, wherein a distortion at an output of the first PGA at the first operating frequency is non-zero, and wherein a distortion at an output of the second PGA at the second operating frequency is non-zero, and wherein the first PGA and the second PGA are coupled together to provide a distortion of approximately zero at least one of the first operating frequency and the second operating frequency.

30. The transmitter of claim 23, wherein the first PGA is configured to have an output inductance that corresponds with the first resonant frequency, and wherein the second PGA is configured to have an output inductance that corresponds with the second resonant frequency.

31. The transmitter of claim 23, wherein the first operating frequency and the second operating frequency are each approximately 2.4 GHz.

32. The transmitter of claim 23, wherein the first resonant frequency is approximately 2 GHz, and wherein the second resonant frequency is approximately 3 GHz.

33. The transmitter of claim 23, wherein the first operating frequency is a center frequency of a signal received by the first PGA, and wherein the second operating frequency is the center frequency of the signal received by the second PGA.

34. A method comprising:
tuning a first programmable gain amplifier (PGA) to have a first resonant frequency that is less than a first operating frequency of the first PGA;
tuning a second PGA to have a second resonant frequency that is greater than a second operating frequency of the second PGA; and
coupling the first PGA and the second PGA together to provide a substantially linear response across a plurality of frequencies that includes at least one of the first operating frequency and the second operating frequency.

35. The method of claim 34, wherein the first operating frequency and the second operating frequency are same.

36. The method of claim 34, wherein coupling the first PGA and the second PGA together includes coupling the first PGA and the second PGA in parallel.

37. The method of claim 34, wherein coupling the first PGA and the second PGA together is performed to provide a substantially linear magnitude response.

38. The method of claim 34, wherein coupling the first PGA and the second PGA together is performed to provide a substantially linear phase response.

39. The method of claim 34, wherein coupling the first PGA and the second PGA together includes summing a first non-linear response at an output of the first PGA and a second non-linear response at an output of the second PGA.

40. The method of claim 34, wherein tuning the first PGA provides a non-zero distortion at an output of the first PGA at the first operating frequency, and wherein tuning the second PGA provides a non-zero distortion at an output of the second PGA at the second operating frequency, and wherein coupling the first PGA and the second PGA together provides a distortion of approximately zero at least one of the first operating frequency and the second operating frequency.

41. The method of claim 34, wherein tuning the first PGA includes configuring the first PGA to have an output inductance that corresponds with the first resonant frequency, and wherein tuning the second PGA includes configuring the second PGA to have an output inductance that corresponds with the second resonant frequency.

42. The method of claim 34, wherein the first operating frequency and the second operating frequency are each approximately 2.4 GHz.

43. The method of claim 34, wherein tuning the first PGA includes tuning the first PGA to have the first resonant frequency of approximately 2 GHz, and wherein tuning the second PGA includes tuning the second PGA to have the second resonant frequency of approximately 3 GHz.

44. The method of claim 34, wherein the first operating frequency is a center frequency of a signal received by the first PGA, and wherein the second operating frequency is the center frequency of the signal received by the second PGA.

* * * * *